(12) United States Patent
Yamakawa et al.

(10) Patent No.: US 9,553,541 B2
(45) Date of Patent: Jan. 24, 2017

(54) ELECTRIC MOTOR CONTROL APPARATUS

(71) Applicant: TOYOTA JIDOSHA KABUSHIKI KAISHA, Toyota-shi, Aichi (JP)

(72) Inventors: Toshifumi Yamakawa, Shizuoka-ken (JP); Masaki Okamura, Toyota (JP); Naoyoshi Takamatsu, Shizuoka-ken (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/913,203

(22) PCT Filed: Nov. 6, 2013

(86) PCT No.: PCT/JP2013/080018
§ 371 (c)(1),
(2) Date: Feb. 19, 2016

(87) PCT Pub. No.: WO2015/025437
PCT Pub. Date: Feb. 26, 2015

(65) Prior Publication Data
US 2016/0211792 A1 Jul. 21, 2016

(30) Foreign Application Priority Data

Aug. 21, 2013 (JP) ................................. 2013-171517

(51) Int. Cl.
H02P 27/04 (2016.01)
H02P 27/08 (2006.01)
(Continued)

(52) U.S. Cl.
CPC .............. H02P 27/085 (2013.01); H02M 1/15 (2013.01); H02M 7/53875 (2013.01); H02P 27/06 (2013.01)

(58) Field of Classification Search
CPC .... H02M 1/12; H02M 2001/123; H02P 27/06; H02P 27/085
(Continued)

(56) References Cited

U.S. PATENT DOCUMENTS 3,660,766 A * 5/1972 Hilliard, Jr. ............ H03B 21/02
327/105
4,115,726 A * 9/1978 Patterson ............... G05B 19/40
318/696

(Continued)

FOREIGN PATENT DOCUMENTS

JP 2006-115635 A 4/2006
JP 3906843 B2 4/2007
(Continued)

*Primary Examiner* — Bentsu Ro
*Assistant Examiner* — Thai Dinh
(74) *Attorney, Agent, or Firm* — Andrews Kurth Kenyon LLP

(57) ABSTRACT

The purpose is to suppress ripple of voltage between terminals of smoothing condenser. Electric motor control apparatus is electric motor control apparatus that controls electric motor system having electrical power converter, smoothing condenser and three-phase AC electric motor, and has generating device that generates modulation signal by adding third harmonic signal to phase voltage command signal; controlling device that controls operation of electrical power converter by using modulation signal; and adjusting device that adjusts amplitude of third harmonic signal, adjusting device adjusts amplitude of third harmonic signal so that peak value of voltage between terminals of smoothing condenser in the case where amplitude of third harmonic signal is adjusted is smaller than peak value of voltage between terminals in the case where amplitude of third harmonic signal is not adjusted.

15 Claims, 15 Drawing Sheets

(51) Int. Cl.
*H02M 1/15* (2006.01)
*H02M 7/5387* (2007.01)
*H02P 27/06* (2006.01)

(58) Field of Classification Search
USPC ..... 318/503, 599, 606, 629, 400.2, 722, 504
See application file for complete search history.

(56) References Cited

U.S. PATENT DOCUMENTS

| | | | |
|---|---|---|---|
| 6,614,202 B2* | 9/2003 | Edelson | H02P 27/02 318/727 |
| 6,777,907 B2* | 8/2004 | Ho | H02P 21/22 318/432 |
| 8,278,850 B2* | 10/2012 | Gallegos-Lopez | H02M 7/53873 318/400.02 |
| 2005/0067999 A1 | 3/2005 | Okamura et al. | |
| 2007/0195568 A1 | 8/2007 | Sato | |
| 2014/0001990 A1 | 1/2014 | Takamatsu et al. | |

FOREIGN PATENT DOCUMENTS

| | | |
|---|---|---|
| JP | 2010-263775 A | 11/2010 |
| JP | 2015-035897 A | 2/2015 |
| WO | 2012-095946 A1 | 7/2012 |

\* cited by examiner

FIG. 7
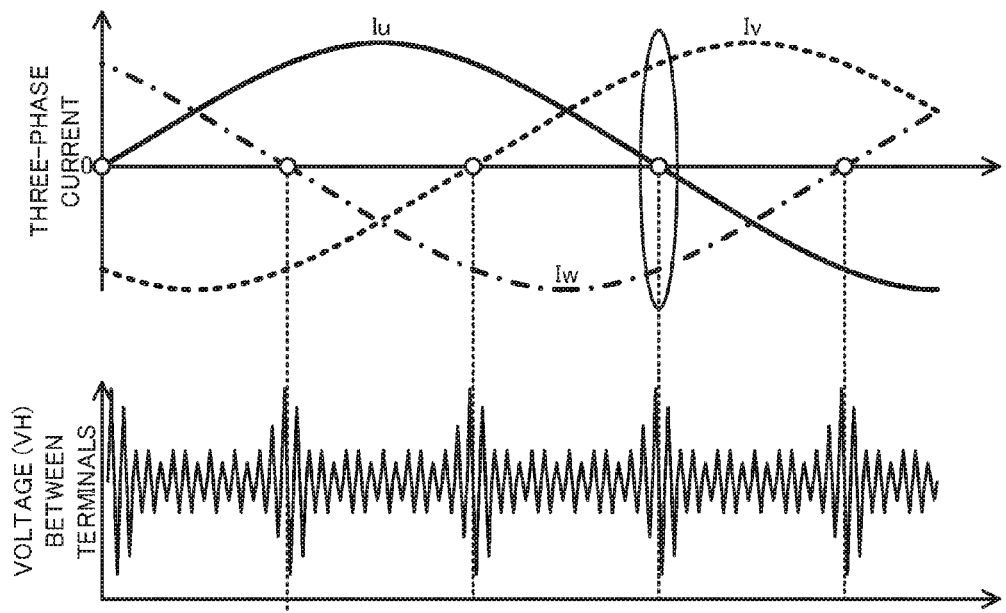
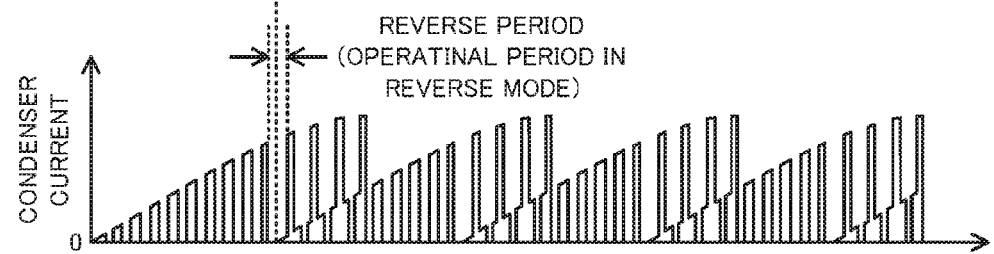
(a)
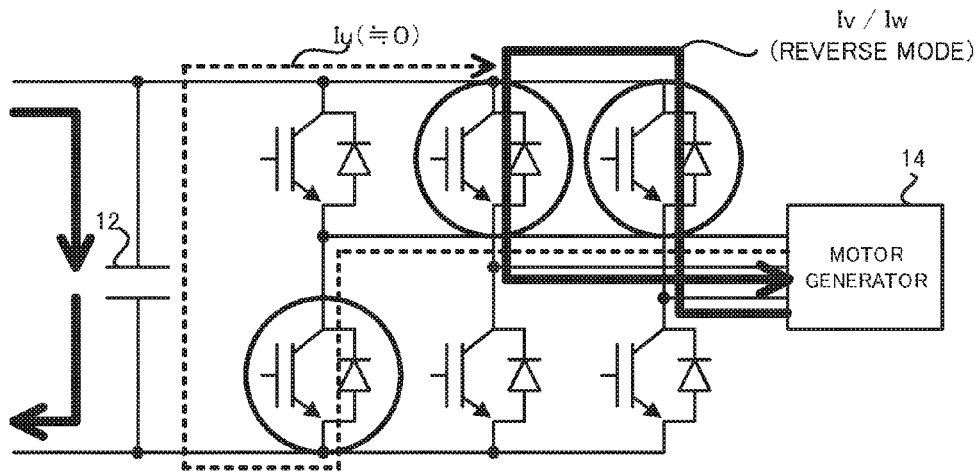
(b)

ELECTRIC MOTOR CONTROL APPARATUS

CROSS-REFERENCE TO RELATED APPLICATIONS

This is a national phase application based on the PCT International Patent Application No. PCT/JP2013/080018 filed Nov. 6, 2013, claiming priority to Japanese Patent Application No. 2013-171517 filed Aug. 21, 2013, the entire contents of both of which are incorporated herein by reference.

TECHNICAL FIELD

The present invention relates to an electric motor control apparatus that controls an electric motor system having a three-phase AC (alternate current) electric motor, for example.

BACKGROUND ART

A PWM (Pulse Width Modulation) control is one example of a control method for driving a three-phase AC electric motor. The PWM control controls an electrical power converter which converts DC (Direct Current) voltage (DC electrical power) to AC voltage (AC electrical power) on the basis of a magnitude relation between phase voltage command signal, which is set from a point of view of making phase current which is supplied to the three-phase AC electric motor to coincide with a desired value, and a carrier signal having predetermined frequency. Incidentally, the PWM control may be used to control an electrical power converter which converts the AC voltage to the DC voltage (see a Patent Literature 1).

By the way, a smoothing condenser for suppressing variation of the AC voltage that is inputted to the electrical power converter or that is outputted from the electrical power converter is often connected electrically in parallel to the electrical power converter. Recently, the smoothing condenser is often downsized by reducing capacity of the smoothing condenser. However, if the capacity of the smoothing condenser is reduced, there is a possibility that ripple (what we call, a pulsation component) of voltage between terminals of the smoothing condenser becomes relatively large. Thus, the Patent Literature 1 discloses a technology that uses third harmonic signal for suppressing (reducing) this ripple of the voltage between the terminals of the smoothing condenser. Specifically, the Patent Literature 1 discloses the technology that controls a switching element of the electrical power converter so that current waveform of input current from an AC electrical power source coincides with combined wave of the third harmonic and sine wave whose frequency is same as that of the AC electrical power.

CITATION LIST

Patent Literature

[Patent Literature 1] Japanese Patent No. 3906843
[Patent Literature 2] Japanese Unexamined Patent Application Publication No. 2010-263775
[Patent Literature 2] Japanese Patent Application Laid Open No. 2006-115635

SUMMARY OF INVENTION

Technical Problem

However, there is a possibility that only the technology disclosed in the Patent Literature 1 cannot effectively suppress the ripple of the voltage between the terminals of the smoothing condenser, depending on a reason why the ripple of the voltage between the terminals of the smoothing condenser occurs, which is a technical problem.

The above described problem is listed as one example of the problem that the present invention tries to solve. It is a problem of the present invention to provide an electric motor control apparatus that can appropriately suppress the ripple of the voltage between the terminals of the smoothing condenser.

Solution to Problem

<1>

An electric motor control apparatus of the present invention is an electric motor control apparatus that controls an electric motor system, the electric motor system has: a DC (Direct Current) power source; an electrical power converter that converts DC electrical power supplied from the DC power source to AC (Alternate Current) electrical power; a smoothing condenser that is connected electrically in parallel to the electrical power converter; and a three-phase AC electric motor that operates by using the AC electrical power outputted from the electrical power converter, the electric motor control apparatus has: a generating device that generates modulation signal by adding third harmonic signal to phase voltage command signal that determines operation of the three-phase AC electric motor; a controlling device that controls the operation of the electrical power converter by using the modulation signal; and an adjusting device that adjusts amplitude of the third harmonic signal, the adjusting device adjusts the amplitude of the third harmonic signal so that a peak value of voltage between terminals of the smoothing condenser in the case where the amplitude of the third harmonic signal is adjusted is smaller than a peak value of the voltage between the terminals in the case where the amplitude of the third harmonic signal is not adjusted.

According to the electric motor control apparatus, the electric motor system can be controlled. The electric motor system that is a target for the control of the electric motor control apparatus has the DC power source, the smoothing condenser, the electrical power converter and the three-phase AC electric motor. The DC power source outputs the DC electrical power (in other words, DC voltage and DC current). The smoothing condenser is connected electrically in parallel to the electrical power converter. Typically, the smoothing condenser is connected electrically in parallel to the DC power source. Therefore, the smoothing condenser can suppress variation of the voltage between the terminals of the smoothing condenser (namely, voltage between the terminals of each of the DC power source and the electrical power converter). The electrical power converter converts the DC electrical power, which is supplied from the DC power source, to the AC electrical power (typically, three-phase AC electrical power). As a result, the three-phase AC electric motor operates by using the AC electrical power that is supplied to the three-phase AC electric motor from the electrical power converter.

In order to control this electric motor system, the electric motor control apparatus has the generating device, the controlling device and the adjusting device.

The generating device generates the modulation signal by adding the third harmonic signal to the phase voltage command signal. Namely, the generating device adds the third harmonic signal to the phase voltage command signal in each phase of the three-phase AC electric motor (namely, each of the three phases including U-phase, V-phase and W-phase). As a result, the generating device generates the modulation signal in each phase of the three-phase AC electric motor (namely, each of the three phases including U-phase, V-phase and W-phase).

The phase voltage command signal is AC signal that determines the operation of the three-phase AC electric motor. For example, the phase voltage command signal may be appropriately set from a point of view of making torque that is outputted from the three-phase AC electric motor to coincide with a desired value. The third harmonic signal is a signal (typically, AC signal) whose frequency is triple the frequency of the phase voltage command signal.

Incidentally, common third harmonic signal that is commonly used in all of the three phases of the three-phase AC electric motor may be used as the third harmonic signal. In this case, the common third harmonic signal may be added to the phase voltage command single in each phase. Alternatively, the third harmonic signal that is individually (separately) prepared for each of the three phases of the three-phase AC electric motor may be used as the third harmonic signal. In this case, respective one third harmonic signal that corresponds to each phase may be added to the phase voltage command signal in each phase.

The controlling device controls the operation of the electrical power converter by using the modulation signal that is generated by the generating device. For example, the controlling device may controls the operation of the electrical power converter on the basis of a magnitude relation between the modulation signal and carrier signal having predetermined frequency. As a result, the electrical power converter supplies the AC electrical power based on the phase voltage command signal to the three-phase AC electric motor. Therefore, the three-phase AC electric motor operates in an aspect based on the phase voltage command signal.

The adjusting device adjusts the amplitude of the third harmonic signal. Specifically, the adjusting device adjusts the amplitude of the third harmonic signal so that the peak value of the voltage between the terminals of the smoothing condenser (preferably, a peak value of ripple of the voltage between the terminal, same is true in the following explanation) in the case where the amplitude of the third harmonic signal is adjusted is smaller than the peak value of the voltage between the terminals in the case where the amplitude of the third harmonic signal is not adjusted. Namely, the adjusting device adjusts the amplitude of the third harmonic signal so that the peak value of the voltage between the terminals in the case where the operation of the electrical power converter is controlled by using the modulation signal (amplitude-adjusted modulation signal described later) that is generated by adding the third harmonic signal whose amplitude is adjusted is smaller than the peak value of the voltage between the terminals in the case where the operation of the electrical power converter is controlled by using the modulation signal (amplitude-non-adjusted modulation signal described later) that is generated by adding the third harmonic signal whose amplitude is not adjusted. As a result, the amplitude of the third harmonic signal is adjusted so that the ripple of the voltage between the terminals of the smoothing condenser becomes relatively small. Therefore, the electric motor control apparatus can appropriately suppress the ripple of the voltage between the terminals of the smoothing condenser.

Incidentally, in order to adjust the amplitude of the third harmonic signal in the above described aspect, the adjusting device may timely monitor the voltage between the terminals of the smoothing condenser (alternatively, its peak value) and may adjust the amplitude of the third harmonic signal by a feedback control using the monitored voltage between the terminals.

As described above, the electric motor control apparatus can adjust the amplitude of the third harmonic signal so that the peak value of the voltage between the terminals of the smoothing condenser becomes relatively small. Therefore, the electric motor control apparatus can suppress the ripple of the voltage between the terminals of the smoothing condenser appropriately.

<2>

In another aspect of the electric motor control apparatus of the present invention, the adjusting device adjusts the amplitude of the third harmonic signal so that the amplitude of the third harmonic signal becomes a first predetermined value, if a peak value of the voltage between the terminals in the case where the amplitude of the third harmonic signal is the first predetermined value is smaller than a peak value of the voltage between the terminals in the case where the amplitude of the third harmonic signal is a second predetermined value.

According to this aspect, the adjusting device can adjust the amplitude of the third harmonic signal so that the peak value of the voltage between the terminals of the smoothing condenser becomes smaller (preferably, becomes as small as possible or becomes minimum). Therefore, the electric motor control apparatus can suppress the ripple of the voltage between the terminals of the smoothing condenser more appropriately.

<3>

In another aspect of the electric motor control apparatus of the present invention, the adjusting device adjusts the amplitude of the third harmonic signal so that a variation width of ripple of the voltage between the terminals at a positive polarity side of a target value of the voltage between the terminals is smaller than a variation width of the ripple of the voltage between the terminals at a negative polarity side of the target value of the voltage between the terminals while a variation width of the ripple of the voltage between the terminals is maintained.

According to this aspect, the adjusting device can adjust the amplitude of the third harmonic signal so that the variation width of the ripple of the voltage between the terminals at the positive polarity side (namely, at positive side of (from) the target value) is smaller than the variation width of the ripple of the voltage between the terminals at the negative polarity side (namely, at negative side of (from) the target value). If a center value of the ripple of the voltage between the terminals at the positive polarity side decreases, the peak value of the voltage between the terminals also decreases. Therefore, the electric motor control apparatus can suppress the ripple of the voltage between the terminals of the smoothing condenser more appropriately.

<4>

In another aspect of the electric motor control apparatus of the present invention, the adjusting device adjusts the amplitude of the third harmonic signal so that a state of the voltage between the terminals changes from a state where a period during which the voltage between the terminals decreases is longer than a period during which the voltage between the terminals increases to a state where the period during which the voltage between the terminals increases is longer than the period during which the voltage between the terminals decreases.

According to this aspect, as described later in detail by using drawing, waveform of the voltage between the terminals of the smoothing condenser becomes a waveform that is convex downward (namely, projects to a side toward which the voltage VH between the terminals decreases) more easily than the case where the amplitude of the third harmonic signal is not adjusted. As a result, the peak value of the voltage between the terminals decreases easily. Therefore, the electric motor control apparatus can suppress the ripple of the voltage between the terminals of the smoothing condenser more appropriately.

<5>

In another aspect of the electric motor control apparatus of the present invention, the adjusting device adjusts the amplitude of the third harmonic signal so that a magnitude relation between amplitude-adjusted modulation signal that is the modulation signal generated by adding the third harmonic signal whose amplitude is adjusted and amplitude-non-adjusted modulation signal that is the modulation signal generated by adding the third harmonic signal whose amplitude is not adjusted changes from a first state where signal level of the amplitude-adjusted modulation signal is larger than signal level of the amplitude-non-adjusted modulation signal to a second state where the signal level of the amplitude-adjusted modulation signal is smaller than the signal level of the amplitude-non-adjusted modulation signal or from the second state to the first state.

According to this aspect, the adjusting device adjusts the amplitude of the third harmonic signal so that the magnitude relation between the amplitude-adjusted modulation signal and the amplitude-non-adjusted modulation signal satisfies the following requirement. Incidentally, the magnitude relation between the amplitude-adjusted modulation signal and the amplitude-non-adjusted modulation signal may not always satisfy the following requirement. Namely, the adjusting device may adjust the amplitude of the third harmonic signal so that the magnitude relation between the amplitude-adjusted modulation signal and the amplitude-non-adjusted modulation signal satisfies the following requirement in at least one portion of a certain period.

More specifically, the adjusting device may adjust the amplitude of the third harmonic signal so that the magnitude relation between the amplitude-adjusted modulation signal and the amplitude-non-adjusted modulation signal changes from the first state to the second state. Namely, the adjusting device may adjust the amplitude of the third harmonic signal so that the magnitude relation between the amplitude-adjusted modulation signal and the amplitude-non-adjusted modulation signal, which is in the first state at first, changes to the second state as time passes.

Alternatively, the adjusting device may adjust the amplitude of the third harmonic signal so that the magnitude relation between the amplitude-adjusted modulation signal and the amplitude-non-adjusted modulation signal changes from the second state to the first state. Namely, the adjusting device may adjust the amplitude of the third harmonic signal so that the magnitude relation between the amplitude-adjusted modulation signal and the amplitude-non-adjusted modulation signal, which is in the second state at first, changes to the first state as time passes.

The first state is a state where the signal level of the amplitude-adjusted modulation signal is larger than the signal level of the amplitude-non-adjusted modulation signal. For example, when the signal level of the amplitude-adjusted modulation signal is +A (A>0) and the signal level of the amplitude-non-adjusted modulation signal is +B (B>0), the first state is a state where A>B is satisfied. On the other hand, when the signal level of the amplitude-adjusted modulation signal is −A and the signal level of the ampli- tude-non-adjusted modulation signal is −B, the first state is a state where −A>−B (namely, A<B) is satisfied.

The second state is a state where the signal level of the amplitude-adjusted modulation signal is smaller than the signal level of the amplitude-non-adjusted modulation signal. For example, when the signal level of the amplitude-adjusted modulation signal is +A and the signal level of the amplitude-non-adjusted modulation signal is +B, the second state is a state where A<B is satisfied. On the other hand, when the signal level of the amplitude-adjusted modulation signal is −A and the signal level of the amplitude-non-adjusted modulation signal is −B, the second state is a state where −A<−B (namely, A>B) is satisfied.

When the amplitude of the third harmonic signal is adjusted in the above described aspect, as described later in detail by using drawing, the waveform of the voltage between the terminals of the smoothing condenser becomes the waveform that is convex downward (namely, projects to the side toward which the voltage between the terminals decreases) more easily than the case where the amplitude of the third harmonic signal is not adjusted. As a result, the peak value of the voltage between the terminals decreases easily. Therefore, the electric motor control apparatus can suppress the ripple of the voltage between the terminals of the smoothing condenser more appropriately.

<6>

In another aspect of the above described electric motor control apparatus that adjusts the amplitude of the third harmonic signal so that the magnitude relation between the amplitude-adjusted modulation signal and the amplitude-non-adjusted modulation signal changes from the first state to the second state or from the second state to the first state, the adjusting device adjusts the amplitude of the third harmonic signal so that the magnitude relation between the amplitude-adjusted modulation signal and the amplitude-non-adjusted modulation signal changes from the first state to the second state or from the second state to the first state at a border point where the signal levels of the amplitude-adjusted modulation signal and the amplitude-non-adjusted modulation signal become zero.

According to this aspect, the voltage between the terminals becomes relatively small at a time around when the magnitude relation between the amplitude-adjusted modulation signal and the amplitude-non-adjusted modulation signal changes from the first state to the second state or from the second state to the first state (namely, the point where the signal level of each of the amplitude-adjusted modulation signal and the amplitude-non-adjusted modulation signal becomes zero). As a result, the peak value of the voltage between the terminals decreases easily. Therefore, the electric motor control apparatus can suppress the ripple of the voltage between the terminals of the smoothing condenser more appropriately.

<7>

In another aspect of the above described electric motor control apparatus that adjusts the amplitude of the third harmonic signal so that the magnitude relation between the amplitude-adjusted modulation signal and the amplitude-non-adjusted modulation signal changes from the first state to the second state or from the second state to the first state, the adjusting device adjusts the amplitude of the third harmonic signal in an aspect that is determined on the basis of (i) a variation aspect of the signal level of the amplitude-non-adjusted modulation signal and (ii) a magnitude relation between a first current that flows between the DC power source and the smoothing condenser and a second current that flows between the three-phase AC electric motor and the smoothing condenser.

According to this aspect, the adjusting device can adjust the amplitude of the third harmonic signal on the basis of the variation aspect of the signal level of the amplitude-non-adjusted modulation signal and the magnitude relation between the first and second currents so that the waveform of the voltage between the terminals of the smoothing condenser becomes the waveform that is convex downward (namely, projects to the side toward which the voltage between the terminals decreases) easily. As a result, the peak value of the voltage between the terminals decreases easily. Therefore, the electric motor control apparatus can suppress the ripple of the voltage between the terminals of the smoothing condenser more appropriately.

Incidentally, the adjusting device may adjust the amplitude of the third harmonic signal in the aspect that is determined on the basis of (i) the variation aspect of the signal level of the amplitude-non-adjusted modulation signal and (ii) the magnitude relation between the first current that flows between the DC power source and the smoothing condenser and the second current that flows between the three-phase AC electric motor and the smoothing condenser, not only when the amplitude of the third harmonic signal is adjusted so that the magnitude relation between the amplitude-adjusted modulation signal and the amplitude-non-adjusted modulation signal changes from the first state to the second state or from the second state to the first state.

<8>

In another aspect of the above described electric motor control apparatus that adjusts the amplitude of the third harmonic signal in the aspect that is determined on the basis of the variation aspect of the signal level of the amplitude-non-adjusted modulation signal and the magnitude relation between the first and second currents, the adjusting device adjusts the amplitude of the third harmonic signal in a first adjusting aspect, if (i) the signal level of the amplitude-non-adjusted modulation signal varies in a first variation aspect and (ii) the magnitude relation between the first and second currents is a first relation, the adjusting device adjusts the amplitude of the third harmonic signal in a second adjusting aspect that is different from the first adjusting aspect, if (i) the signal level of the amplitude-non-adjusted modulation signal varies in a second variation aspect that is different from the first variation aspect and (ii) the magnitude relation between the first and second currents is the first relation.

According to this aspect, the adjusting device adjusts the amplitude of the third harmonic signal to change the adjusting aspect of the amplitude of the third harmonic signal on the basis of the difference of the variation aspect of the signal level of the amplitude-non-adjusted modulation signal under a situation where the magnitude relation between the first and second currents does not change. As a result, as described later in detail by using drawing, the adjusting device can adjust the amplitude of the third harmonic signal so that the waveform of the voltage between the terminals of the smoothing condenser becomes the waveform that is convex downward (namely, projects to the side toward which the voltage between the terminals decreases) easily. As a result, the peak value of the voltage between the terminals decreases easily. Therefore, the electric motor control apparatus can suppress the ripple of the voltage between the terminals of the smoothing condenser more appropriately.

Incidentally, the adjusting device may adjust the amplitude of the third harmonic signal so that the magnitude relation between the amplitude-adjusted modulation signal and the amplitude-non-adjusted modulation signal changes from the first state to the second state, if (i) the signal level of the amplitude-non-adjusted modulation signal varies in the first variation aspect and (ii) the magnitude relation between the first and second currents is the first relation, and the adjusting device may adjust the amplitude of the third harmonic signal so that the magnitude relation between the amplitude-adjusted modulation signal and the amplitude-non-adjusted modulation signal changes from the second state to the first state, if (i) the signal level of the amplitude-non-adjusted modulation signal varies in the second variation aspect that is different from the first variation aspect and (ii) the magnitude relation between the first and second currents is the first relation. Namely, the adjusting device may adjust the amplitude of the third harmonic signal to change the changing aspect of the magnitude relation between the amplitude-adjusted modulation signal and the amplitude-non-adjusted modulation signal on the basis of the difference of the variation aspect of the signal level of the amplitude-non-adjusted modulation signal under the situation where the magnitude relation between the first and second currents does not change.

Moreover, the adjusting device may adjust the amplitude of the third harmonic signal in the first adjusting aspect, if (i) the signal level of the amplitude-non-adjusted modulation signal varies in the first variation aspect and (ii) the magnitude relation between the first and second currents is the first relation, and the adjusting device may adjust the amplitude of the third harmonic signal in the second adjusting aspect that is different from the first adjusting aspect, if (i) the signal level of the amplitude-non-adjusted modulation signal varies in the second variation aspect that is different from the first variation aspect and (ii) the magnitude relation between the first and second currents is the first relation, not only when the amplitude of the third harmonic signal is adjusted so that the magnitude relation between the amplitude-adjusted modulation signal and the amplitude-non-adjusted modulation signal changes from the first state to the second state or from the second state to the first state.

<9>

In another aspect of the above described electric motor control apparatus that adjusts the amplitude of the third harmonic signal to change the changing aspect of the magnitude relation between the amplitude-adjusted modulation signal and the amplitude-non-adjusted modulation signal on the basis of the difference of the variation aspect of the signal level of the amplitude-non-adjusted modulation signal, the first variation aspect is one of a variation aspect in which the signal level of the amplitude-non-adjusted modulation signal increases as time passes and a variation aspect in which the signal level of the amplitude-non-adjusted modulation signal decreases as time passes, the second variation aspect is the other one of the variation aspect in which the signal level of the amplitude-non-adjusted modulation signal increases as time passes and the variation aspect in which the signal level of the amplitude-non-adjusted modulation signal decreases as time passes, the first relation is one of a relation in which the first current is larger than the second current and a relation in which the first current is smaller than the second current, the first adjusting aspect is one of an adjusting aspect in which the amplitude of the third harmonic signal is increased and an adjusting aspect in which the amplitude of the third harmonic signal is decreased, the second adjusting aspect is the other one of the adjusting aspect in which the amplitude of the third harmonic signal is increased and the adjusting aspect in which the amplitude of the third harmonic signal is decreased.

According to this aspect, the adjusting device adjusts the amplitude of the third harmonic signal to change the adjusting aspect of the amplitude of the third harmonic signal on the basis of the difference whether or not the signal level of the amplitude-non-adjusted modulation signal increases (in other words, decreases) as time passes under the situation where the magnitude relation between the first and second currents does not change.

<10>

In another aspect of the above described electric motor control apparatus that adjusts the amplitude of the third harmonic signal in the aspect that is determined on the basis of the variation aspect of the signal level of the amplitude-non-adjusted modulation signal and the magnitude relation between the first and second currents, the adjusting device adjusts the amplitude of the third harmonic signal in a first adjusting aspect, if (i) the signal level of the amplitude-non-adjusted modulation signal varies in a first variation aspect and (ii) the magnitude relation between the first and second currents is a first relation, the adjusting device adjusts the amplitude of the third harmonic signal in a second adjusting aspect that is different from the first adjusting aspect, if (i) the signal level of the amplitude-non-adjusted modulation signal varies in the first variation aspect and (ii) the magnitude relation between the first and second currents is a second relation that is different from the first relation.

According to this aspect, the adjusting device adjusts the amplitude of the third harmonic signal to change the adjusting aspect of the amplitude of the third harmonic signal on the basis of the difference of the magnitude relation between the first and second currents under a situation where the variation aspect of the signal level of the amplitude-non-adjusted modulation signal does not change. As a result, as described later in detail by using drawing, the adjusting device can adjust the amplitude of the third harmonic signal so that the waveform of the voltage between the terminals of the smoothing condenser becomes the waveform that is convex downward (namely, projects to the side toward which the voltage between the terminals decreases) easily. As a result, the peak value of the voltage between the terminals decreases easily. Therefore, the electric motor control apparatus can suppress the ripple of the voltage between the terminals of the smoothing condenser more appropriately.

Incidentally, the adjusting device may adjust the amplitude of the third harmonic signal so that the magnitude relation between the amplitude-adjusted modulation signal and the amplitude-non-adjusted modulation signal changes from the first state to the second state, if (i) the signal level of the amplitude-non-adjusted modulation signal varies in the first variation aspect and (ii) the magnitude relation between the first and second currents is the first relation, and the adjusting device may adjust the amplitude of the third harmonic signal so that the magnitude relation between the amplitude-adjusted modulation signal and the amplitude-non-adjusted modulation signal changes from the second state to the first state, if (i) the signal level of the amplitude-non-adjusted modulation signal varies in the first variation aspect and (ii) the magnitude relation between the first and second currents is the second relation that is different from the first relation. Namely, the adjusting device may adjust the amplitude of the third harmonic signal to change the changing aspect of the magnitude relation between the amplitude-adjusted modulation signal and the amplitude-non-adjusted modulation signal on the basis of the difference of the magnitude relation between the first and second currents under the situation where the variation aspect of the signal level of the amplitude-non-adjusted modulation signal does not change.

Moreover, the adjusting device may adjust the amplitude of the third harmonic signal in the first adjusting aspect, if (i) the signal level of the amplitude-non-adjusted modulation signal varies in the first variation aspect and (ii) the magnitude relation between the first and second currents is the first relation, and the adjusting device may adjust the amplitude of the third harmonic signal in the second adjusting aspect that is different from the first adjusting aspect, if (i) the signal level of the amplitude-non-adjusted modulation signal varies in the first variation aspect and (ii) the magnitude relation between the first and second currents is the second relation that is different from the first relation, not only when the amplitude of the third harmonic signal is adjusted so that the magnitude relation between the amplitude-adjusted modulation signal and the amplitude-non-adjusted modulation signal changes from the first state to the second state or from the second state to the first state.

<11>

In another aspect of the above described electric motor control apparatus that adjusts the amplitude of the third harmonic signal to change the changing aspect of the magnitude relation between the amplitude-adjusted modulation signal and the amplitude-non-adjusted modulation signal on the basis of the difference of the magnitude relation between the first and second currents, the first variation aspect is one of a variation aspect in which the signal level of the amplitude-non-adjusted modulation signal increases as time passes and a variation aspect in which the signal level of the amplitude-non-adjusted modulation signal decreases as time passes, the first relation is one of a relation in which the first current is larger than the second current and a relation in which the first current is smaller than the second current, the second relation is the other one of the relation in which the first current is larger than the second current and the relation in which the first current is smaller than the second current, the first adjusting aspect is one of an adjusting aspect in which the amplitude of the third harmonic signal is increased and an adjusting aspect in which the amplitude of the third harmonic signal is decreased, the second adjusting aspect is the other one of the adjusting aspect in which the amplitude of the third harmonic signal is increased and the adjusting aspect in which the amplitude of the third harmonic signal is decreased.

According to this aspect, the adjusting device adjusts the amplitude of the third harmonic signal to change the changing aspect of the magnitude relation between the amplitude-adjusted modulation signal and the amplitude-non-adjusted modulation signal on the basis of the difference whether or not the first current is larger than the second current (in other words, the first current is smaller than the second current) under the situation where the variation aspect of the signal level of the amplitude-non-adjusted modulation signal does not change.

<12>

In another aspect of the above described electric motor control apparatus that adjusts the amplitude of the third harmonic signal so that the magnitude relation between the amplitude-adjusted modulation signal and the amplitude-non-adjusted modulation signal changes from the first state to the second state or from the second state to the first state, the controlling device controls the operation of the electrical power converter on the basis of a magnitude relation between the modulation signal and carrier signal having predetermined frequency, the first state is (i) a state where a period during which the amplitude-adjusted modulation signal is smaller than the carrier signal is shorter than a period during which the amplitude-non-adjusted modulation signal is smaller than the carrier signal or (ii) a state where a period during which the amplitude-adjusted modulation signal is larger than the carrier signal is longer than a period during which the amplitude-non-adjusted modulation signal is larger than the carrier signal, the second state is (i) a state where the period during which the amplitude-adjusted modulation signal is smaller than the carrier signal is longer than the period during which the amplitude-non-adjusted modulation signal is smaller than the carrier signal or (ii) a state where the period during which the amplitude-adjusted modulation signal is larger than the carrier signal is shorter than the period during which the amplitude-non-adjusted modulation signal is larger than the carrier signal.

According to this aspect, when the magnitude relation between the amplitude-adjusted modulation signal and the amplitude-non-adjusted modulation signal is the first state, the period during which the amplitude-adjusted modulation signal is smaller than the carrier signal is shorter than the period during which the amplitude-non-adjusted modulation signal is smaller than the carrier signal, as described later in detail by using drawing. Namely, the period during which the amplitude-adjusted modulation signal is larger than the carrier signal is longer than the period during which the amplitude-non-adjusted modulation signal is larger than the carrier signal. On the other hand, when the magnitude relation between the amplitude-adjusted modulation signal and the amplitude-non-adjusted modulation signal is the second state, the period during which the amplitude-adjusted modulation signal is smaller than the carrier signal is longer than the period during which the amplitude-non-adjusted modulation signal is smaller than the carrier signal, as described later in detail by using drawing. Namely, the period during which the amplitude-adjusted modulation signal is larger than the carrier signal is shorter than the period during which the amplitude-non-adjusted modulation signal is larger than the carrier signal.

When the amplitude of the third harmonic signal is adjusted in the above described aspect, as described later in detail by using drawing, the waveform of the voltage between the terminals of the smoothing condenser becomes the waveform that is convex downward (namely, projects to the side toward which the voltage between the terminals decreases) more easily than the case where the amplitude of the third harmonic signal is not adjusted. As a result, the peak value of the voltage between the terminals decreases easily. Therefore, the electric motor control apparatus can suppress the ripple of the voltage between the terminals of the smoothing condenser more appropriately.

<13>

In another aspect of the above described electric motor control apparatus that adjusts the amplitude of the third harmonic signal so that the magnitude relation between the amplitude-adjusted modulation signal and the amplitude-non-adjusted modulation signal changes from the first state to the second state or from the second state to the first state, the controlling device controls the operation of the electrical power converter on the basis of a magnitude relation between the modulation signal and carrier signal having predetermined frequency, the adjusting device adjusts the amplitude of the third harmonic signal so that the magnitude relation between the amplitude-adjusted modulation signal and the amplitude-non-adjusted modulation signal in one of three phases changes from the first state to the second state or from the second state to the first state in a period during which an absolute value of the signal level of the modulation single in each of the other two of three phases is larger than an absolute value of a peak value of signal level of the carrier signal.

According to this aspect, if the absolute value of the signal level of the modulation signal in each of two phases is larger than the absolute value of the peak value (namely, a maximum value or a minimum value) of the signal level of the carrier signal, the operation of the electrical power converter is substantially controlled on the basis of the modulation signal in the remaining one phase, considering the premise of the three-phase AC. In this case, even if the amplitude of the third harmonic signal is adjusted so that the magnitude relation between the amplitude-adjusted modulation signal in the remaining one phase and the amplitude-non-adjusted modulation signal in the remaining one phase satisfies the above described requirement, the adjustment of the amplitude of the third harmonic signal rarely or never results in the change of the magnitude relation between the modulation signal in each of the other two phases and the carrier signal. Therefore, the adjusting device can adjust the amplitude of the third harmonic signal to suppress the ripple of the voltage between the terminals of the smoothing condenser without influencing the operation of the electrical power converter.

<14>

In another aspect of the above described electric motor control apparatus of the present invention, the controlling device controls the operation of the electrical power converter on the basis of a magnitude relation between the modulation signal and carrier signal having predetermined frequency, the adjusting device (i) adjusts the amplitude of the third harmonic signal, if an absolute value of signal level of the modulation single in each of two of three phases is larger than an absolute value of a peak value of signal level of the carrier signal and (ii) does not adjust the amplitude of the third harmonic signal, if the absolute value of the signal level of the modulation single in each of the two of three phases is not larger than the absolute value of the peak value of the signal level of the carrier signal.

According to this aspect, the adjusting device can determine whether or not to adjust the amplitude of the third harmonic signal on the basis of whether or not the absolute value of the signal level of the modulation signal in each of at least two phases is larger than the absolute value of the peak value of the signal level of the carrier signal.

<15>

In another aspect of the above described electric motor control apparatus of the present invention, the controlling device controls the operation of the electrical power converter on the basis of a magnitude relation between the modulation signal and carrier signal having predetermined frequency, the adjusting device adjusts amplitude of the carrier signal, the adjusting device adjusts the amplitude of the carrier signal so that a peak value of the voltage between the terminals in the case where the amplitude of the carrier signal is adjusted is smaller than a peak value of the voltage between the terminals in the case where the amplitude of the carrier signal is not adjusted.

The above described adjustment of the amplitude of the third harmonic signal may change the magnitude relation between the modulation signal and the carrier signal. Thus, the adjusting device can change the magnitude relation between the modulation signal and the carrier signal by adjusting the amplitude of the carrier signal in addition to or instead of the amplitude of the third harmonic signal. Namely, not only the adjustment of the amplitude of the third harmonic signal but also the adjustment of the amplitude of the carrier signal achieves the above described various effects appropriately.

The operation and other advantages of the present invention will become more apparent from embodiments explained below.

BRIEF DESCRIPTION OF DRAWINGS

FIG. 7 includes graphs and block diagram for explaining the reason why the relatively large ripple occurs at the timing when the absolute value of the signal level of the three-phase current value is minimum (typically, zero).

DESCRIPTION OF EMBODIMENTS

Hereinafter, an embodiment of a vehicle control apparatus will be explained.

(1) Structure of Vehicle in First Embodiment

Figure 1:
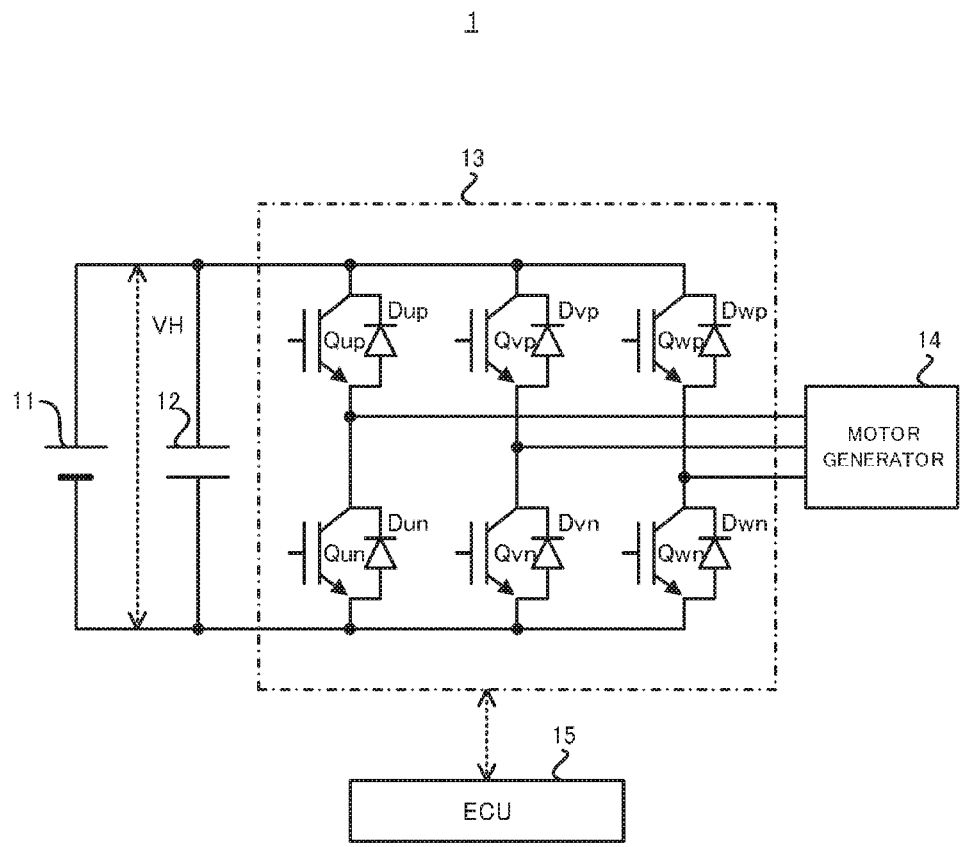
FIG. 1 is a block diagram illustrating the structure of the vehicle in the first embodiment.

Firstly, with reference to FIG. 1, a structure of a vehicle 1 in a first embodiment will be explained. FIG. 1 is a block diagram illustrating the structure of the vehicle 1 in the first embodiment.

As illustrated in FIG. 1, the vehicle 1 has a DC (Direct Current) power source 11, a smoothing condenser 12, an inverter 13 that is one example of the "electrical power converter", a motor generator 14 that is one example of the "three-phase AC (Alternate Current) electric motor" and an ECU (Electronic Control Unit) 15 that is one example of the "electric motor control apparatus".

The DC power source 11 is an electricity storage device that can be charged. A secondary battery (for example, a nickel hydride battery, a lithium ion battery or the like) or a capacitor (for example, an electric double layered capacitor, a large capacity condenser or the like) is one example of the DC power source 11, for example.

The smoothing condenser 12 is a condenser for smoothing voltage that is connected between a positive polarity line of the DC power source 11 and a negative polarity line of the DC power source 11. Namely, the smoothing condenser 12 is a condenser for smoothing variation of voltage VH between terminals of the positive polarity line and the negative polarity line.

The inverter 13 converts DC electrical power (DC voltage) that is supplied from the DC power source 11 to AC (Alternate Current) electrical power (three-phase AC voltage). In order to converts the DC electrical power (the DC voltage) to the AC electrical power (the three-phase AC voltage), the inverter 13 has a U-phase arm including a p-side switching element Qup and a n-side switching element Qun, a V-phase arm including a p-side switching element Qvp and a n-side switching element Qvn and a W-phase arm including a p-side switching element Qwp and a n-side switching element Qwn. The arms of the inverter 13 are connected in parallel between the positive polarity line and the negative polarity line. The p-side switching element Qup and the n-side switching element Qun are connected in series between the positive polarity line and the negative polarity line. The same applies to the p-side switching element Qvp and the n-side switching element Qvn and the p-side switching element Qwp and the n-side switching element Qwn. A rectifier diode Dup that allows current to flow from an emitter terminal of the p-side switching element Qup to a collector terminal of the p-side switching element Qup is connected to the p-side switching element Qup. A rectifier diode Dun to a rectifier diode Dwn are connected to the n-side switching element Qun to the n-side switching element Qwn, respectively, in a same manner. A middle point between an upper arm (namely, each p-side switching element) and a lower arm (namely, each n-side switching element) of each of three phase arms of the inverter 13 is connected to a coil of the motor generator 14 in each phase. As a result, the AC electrical power (the three-phase AC voltage) that is generated by the converting operation of the inverter 13 is supplied to the motor generator 14.

The motor generator 14 is a three-phase AC electric motor generator. The motor generator 14 operates to generate torque that is required for movement of the vehicle 1. The torque that is generated by the motor generator 14 is transmitted to a drive wheel through a driving shaft that is mechanically connected to a rotating shaft of the motor generator 14. Incidentally, the motor generator 14 may perform regeneration (generate the electrical power) when braking of the vehicle 1 is performed.

The ECU 15 is an electrical controlling unit for controlling the operation of the vehicle 1. Especially in the first embodiment, the ECU 15 performs inverter control operation for controlling the operation of the inverter 13. Incidentally, the inverter control operation performed by the ECU 15 will be described later in detail (see FIG. 3 to FIG. 4 and so on).

Figure 2:
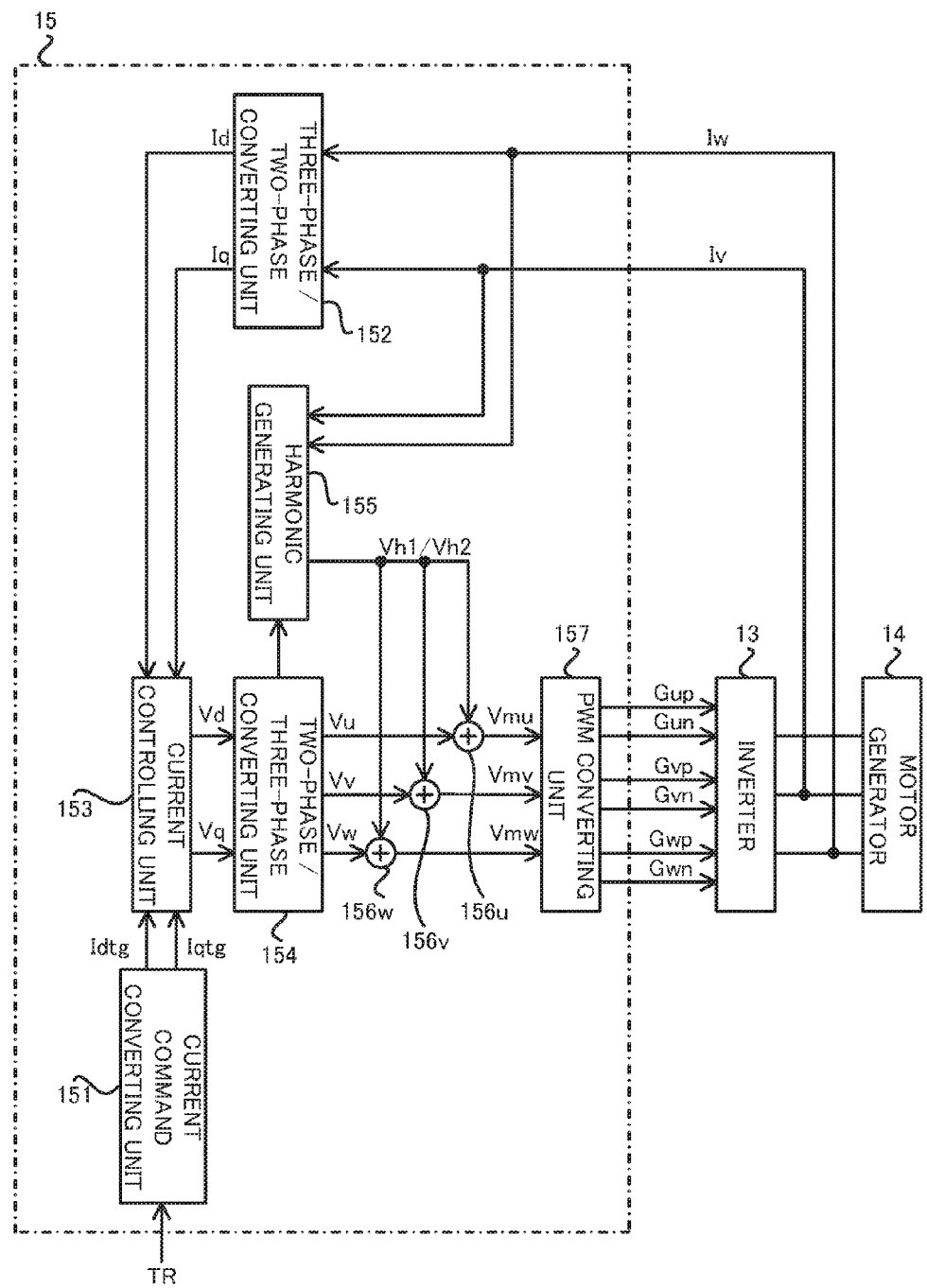
FIG. 2 is a block diagram illustrating the structure of the ECU (especially, the structure for controlling the operation of the inverter).

Here, with reference to FIG. 2, a structure of the ECU 15 (especially, a structure for controlling the operation of the inverter 13) will be explained. FIG. 2 is a block diagram illustrating the structure of the ECU 15 (especially, the structure for controlling the operation of the inverter 13).

As illustrated in FIG. 2, the ECU 15 has a current command converting unit 151, a three-phase/two-phase converting unit 152, a current controlling unit 153, a two-phase/three-phase converting unit 154, a harmonic generating unit 155 that is one example of the "adjusting device", an adder 156u that is one example of the "generating unit", an adder 156v that is one example of the "generating unit", an adder 156w that is one example of the "generating unit" and a PWM (Pulse Width Modulation) converting unit 157.

The current command converting unit 151 generates two-phase current command signal (namely, d-axis current command signal Idtg and q-axis current command signal Iqtg) on the basis of a torque command value TR for the motor generator 14. The current command converting unit 151 outputs the d-axis current command signal Idtg and the q-axis current command signal Iqtg to the current controlling unit 153.

The three-phase/two-phase converting unit 152 obtains, as feedback information, V-phase current Iv and W-phase current Iw from the inverter 13. The three-phase/two-phase converting unit 152 converts the V-phase current Iv and the W-phase current Iw that correspond to three-phase current values to d-axis current Id and q-axis current Iq that correspond to two-phase current values. The three-phase/two-phase converting unit 152 outputs the d-axis current Id and the q-axis current Iq to the current controlling unit 153.

The current controlling unit 153 generates d-axis voltage command signal Vd and q-axis voltage command signal Vq that correspond to two-phase voltage command signals on the basis of difference between the d-axis current command signal Idtg and the q-axis current command signal Iqtg that are outputted from the current command converting unit 151 and the d-axis current Id and the q-axis current Iq that are outputted from the three-phase/two-phase converting unit 152. The current controlling unit 153 outputs the d-axis voltage command signal Vd and the q-axis voltage command signal Vq to the two-phase/three-phase converting unit 154.

The two-phase/three-phase converting unit 154 converts the d-axis voltage command signal Vd and the q-axis voltage command signal Vq to U-phase voltage command signal Vu, V-phase voltage command signal Vv and W-phase voltage command signal Vw that correspond to three-phase voltage command signals. The two-phase/three-phase converting unit 154 outputs the U-phase voltage command signal Vu to the adder 156u. The two-phase/three-phase converting unit 154 outputs the V-phase voltage command signal Vv to the adder 156v. The two-phase/three-phase converting unit 154 outputs the W-phase voltage command signal Vw to the adder 156w.

The harmonic generating unit 155 generates third harmonic signal whose frequency is triple the frequency of each of the three-phase voltage command signal (namely, the U-phase voltage command signal Vu, the V-phase voltage command signal Vv and the W-phase voltage command signal Vw) and the three-phase current value (namely, U-phase current Iu, the V-phase current Iv and the W-phase current Iw). Especially in the present embodiment, the harmonic generating unit 155 generates two types of third harmonic signals Vh1 and Vh2. However, the harmonic generating unit 155 may generate one of two types of third harmonic signals Vh1 and Vh2 and may not generate the other one of two types of third harmonic signals Vh1 and Vh2. Incidentally, two types of third harmonic signals Vh1 and Vh2 will be described later in detail (see FIG. 3 and FIG. 4).

In addition, the harmonic generating unit 155 timely adjusts amplitude of at least one of the generated third harmonic signals Vh1 and Vh2. In the following explanation, the harmonic generating unit 155 is assumed to timely adjust the amplitude of the generated third harmonic signal Vh1, for the purpose of simple explanation. Incidentally, an operation of adjusting the amplitude of the third harmonic signal Vh1 will be described later in detail (see FIG. 9 to FIG. 12).

The adder 156u adds two types of third harmonic signals Vh1 and Vh2 that are generated by the harmonic generating unit 155 to the U-phase voltage command signal Vu that is outputted from the two-phase/three-phase converting unit 154. As a result, the adder 156u generates U-phase modulation signal Vmu (=Vu+Vh1+Vh2). The adder 156u outputs the U-phase modulation signal Vmu to the PWM converting unit 157.

The adder 156v adds two types of third harmonic signals Vh1 and Vh2 that are generated by the harmonic generating unit 155 to the V-phase voltage command signal Vv that is outputted from the two-phase/three-phase converting unit 154. As a result, the adder 156v generates V-phase modulation signal Vmv (=Vv+Vh1+Vh2). The adder 156v outputs the V-phase modulation signal Vmv to the PWM converting unit 157.

The adder 156w adds two types of third harmonic signals Vh1 and Vh2 that are generated by the harmonic generating unit 155 to the W-phase voltage command signal Vw that is outputted from the two-phase/three-phase converting unit 154. As a result, the adder 156w generates W-phase modulation signal Vmw (=Vw+Vh1+Vh2). The adder 156w outputs the W-phase modulation signal Vmw to the PWM converting unit 157.

The PWM converting unit 157 generates U-phase PWM signal Gup for driving the p-side switching element Qup and U-phase PWM signal Gun for driving the n-side switching element Qun on the basis of magnitude relation between the U-phase modulation signal Vmu and carrier signal C having predetermined carrier frequency f. For example, the PWM converting unit 157 may generate the U-phase PWM signals Gup and Gun for turning on the p-side switching element Qup at a timing when the U-phase modulation signal Vmu that is smaller than the carrier signal C at first becomes to coincide with the carrier signal C. On the other hand, for example, the PWM converting unit 157 generates the U-phase PWM signals Gup and Gun for turning on the n-side switching element Qun at a timing when the U-phase modulation signal Vmu that is larger than the carrier signal C at first becomes to coincide with the carrier signal C. The PWM converting unit 157 outputs the U-phase PWM signals Gup and Gun to the inverter 13. As a result, the inverter 13

(especially, the p-side switching element Qup and the n-side switching element Qun that constitutes the U-phase arm of the inverter 13) operates on the basis of the U-phase PWM signals Gup and Gun.

Moreover, the PWM converting unit 157 generates V-phase PWM signal Gyp for driving the p-side switching element Qvp and V-phase PWM signal Gvn for driving the n-side switching element Qvn on the basis of magnitude relation between the V-phase modulation signal Vmv and the carrier signal C. In addition, the PWM converting unit 157 generates W-phase PWM signal Gwp for driving the p-side switching element Qwp and W-phase PWM signal Gwn for driving the n-side switching element Qwn on the basis of magnitude relation between the W-phase modulation signal Vmw and the carrier signal C. A method of generating the V-phase PWM signals Gyp and Gvn and the W-phase PWM signals Gwp and Gwn is same as a method of generating the U-phase PWM signal Gup and Gun.

(2) Flow of Inverter Control Operation in Embodiment

Figure 3:
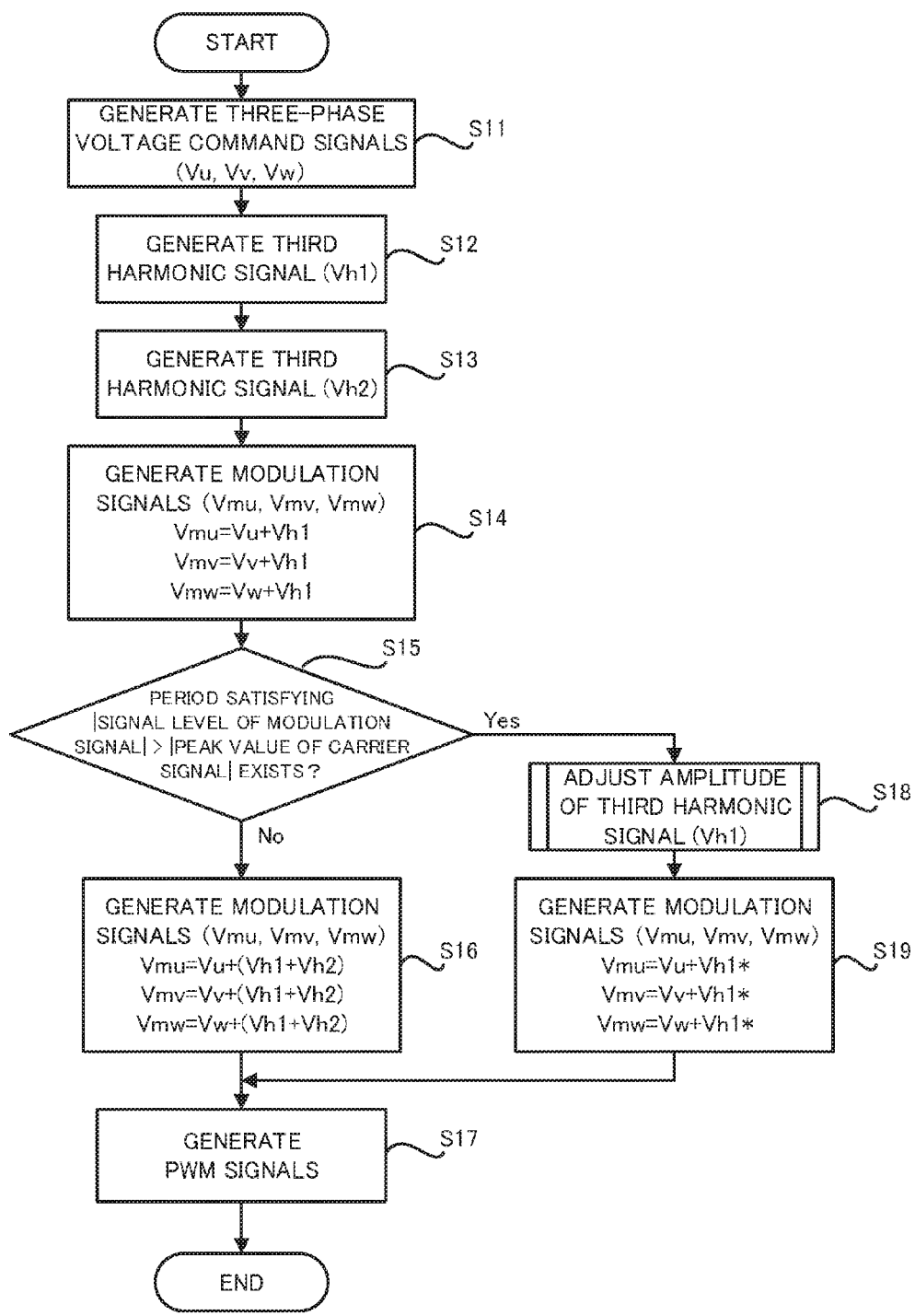
FIG. 3 is a flowchart illustrating the flow of the inverter control operation in the present embodiment.

Next, with reference to FIG. 3, a flow of the inverter control operation that is performed in the vehicle 1 in the present embodiment (namely, the inverter control operation that is performed by the ECU 15) will be explained. FIG. 3 is a flowchart illustrating the flow of the inverter control operation in the present embodiment.

As illustrated in FIG. 3, the two-phase/three-phase converting unit 154 generates the three-phase voltage command signals (namely, the U-phase voltage command signal Vu, the V-phase voltage command signal Vv and the W-phase voltage command signal Vw) (step S11). Incidentally, the method of generating the three-phase voltage command signal is already described with reference to FIG. 2.

In parallel to, after or before the operation at the step S11, the harmonic generating unit 155 generates the third harmonic signal Vh1 (step S12). In parallel to, after or before the operation at the steps S11 and S12, the harmonic generating unit 155 generates the third harmonic signal Vh2 (step S12).

Figure 4:
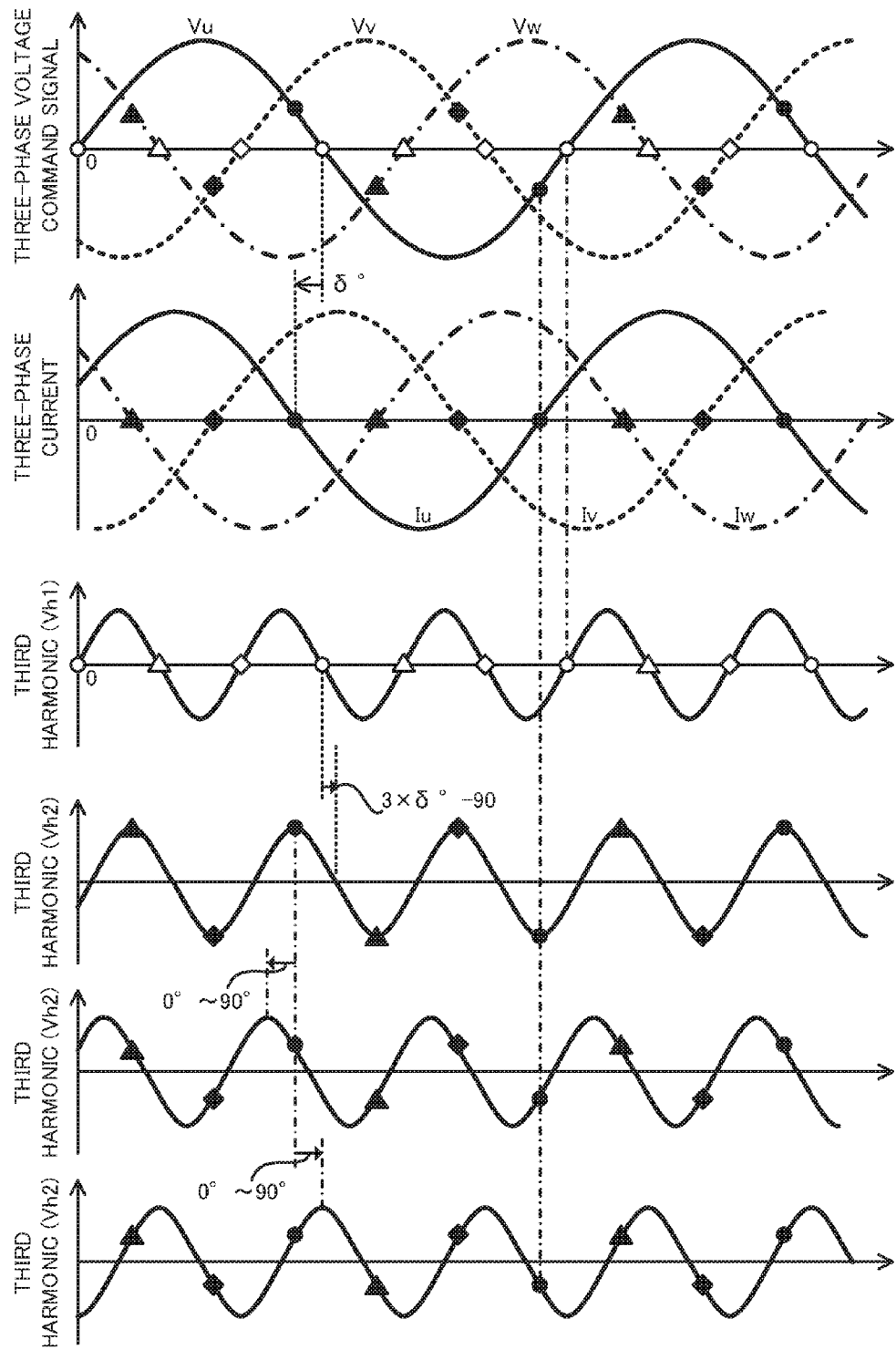
FIG. 4 includes graphs illustrating the third harmonic signals together with the three-phase voltage command signal and three-phase current.

Here, with reference to FIG. 4, the third harmonic signals Vh1 and Vh2 will be explained. FIG. 4 includes graphs illustrating the third harmonic signals Vh1 and Vh2 together with the three-phase voltage command signal and three-phase current.

As illustrated in a third graph in FIG. 4, the third harmonic signal Vh1 is a third harmonic signal whose absolute value of signal level is minimum at a timing when an absolute value of signal level of each of the U-phase voltage command signal Vu, the V-phase voltage command signal Vv and the W-phase voltage command signal Vw (see a first graph in FIG. 4) is minimum. In other words, the third harmonic signal Vh1 is a third harmonic signal that satisfies requirement that a phase at which the absolute value of the signal level of each of the U-phase voltage command signal Vu, the V-phase voltage command signal Vv and the W-phase voltage command signal Vw is minimum is same as a phase at which the absolute value of the signal level of the third harmonic signal Vh1 is minimum. Namely, the third harmonic signal Vh1 is a third harmonic signal whose absolute value of the signal level is minimum at a timing when the absolute value of the signal level of at least one of phase voltage command signals is minimum.

For example, the third harmonic signal Vh1 may be a third harmonic signal whose signal level is zero at a timing when the signal level of each of the U-phase voltage command signal Vu, the V-phase voltage command signal Vv and the W-phase voltage command signal Vw is zero. In other words, the third harmonic signal Vh1 may be a third harmonic signal that satisfies requirement that a phase at which the signal level of each of the U-phase voltage command signal Vu, the V-phase voltage command signal Vv and the W-phase voltage command signal Vw is zero is same as a phase at which the signal level of the third harmonic signal Vh1 is zero.

In an example illustrated by the third graph in FIG. 4, the signal level of the third harmonic signal Vh1 is zero at the timing (see a white circle mark in FIG. 4) when the signal level of the U-phase voltage command signal Vu is zero, for example. The signal level of the third harmonic signal Vh1 is zero at the timing (see a white square mark in FIG. 4) when the signal level of the V-phase voltage command signal Vv is zero in a same manner. The signal level of the third harmonic signal Vh1 is zero at the timing (see a white triangle mark in FIG. 4) when the signal level of the W-phase voltage command signal Vw is zero in a same manner.

The harmonic generating unit 155 may generate the third harmonic signal Vh1 by referring to the three-phase voltage command signal(s) that is generated by the two-phase/three-phase converting unit 154. For example, the harmonic generating unit 155 may generate the third harmonic signal Vh1 by shifting a phase of a basic signal of the third harmonic signal that is defined by parameter(s) stored in a memory or the like in accordance with a phase of the three-phase voltage command signal(s) that is generated by the two-phase/three-phase converting unit 154. Alternatively, for example, the harmonic generating unit 155 may generate the third harmonic signal Vh1 by generating the basic signal of the third harmonic signal by dividing the three-phase voltage command signal(s) and then shifting the phase of the basic signal in accordance with the phase of the three-phase voltage command signal(s) that is generated by the two-phase/three-phase converting unit 154.

On the other hand, as illustrated in a fourth graph in FIG. 4, the third harmonic signal Vh2 is a third harmonic signal whose absolute value of signal level is maximum at a timing when an absolute value of signal level of each of the U-phase current Iu, the V-phase current Iv and the W-phase current Iw (see a second graph in FIG. 4) is minimum. In other words, the third harmonic signal Vh2 is a third harmonic signal that satisfies requirement that a phase at which the absolute value of the signal level of each of the U-phase current Iu, the V-phase current Iv and the W-phase current Iw is minimum is same as a phase at which the absolute value of the signal level of the third harmonic signal Vh2 is maximum. Namely, the third harmonic signal Vh2 is a third harmonic signal whose absolute value of the signal level is maximum at a timing when the absolute value of the signal level of at least one of phase currents is minimum.

For example, the third harmonic signal Vh2 may be a third harmonic signal whose absolute value of signal level is maximum at a timing when the signal level of each of the U-phase current Iu, the V-phase current Iv and the W-phase current Iw is zero.

In addition, the third harmonic signal Vh2 is a third harmonic signal whose polarity is same as a polarity of the U-phase voltage command signal Vu at the timing when the absolute value of the signal level of the U-phase current Iu is minimum. Moreover, the third harmonic signal Vh2 is a third harmonic signal whose polarity is same as a polarity of the V-phase voltage command signal Vv at the timing when the absolute value of the signal level of the V-phase current Iv is minimum. Moreover, the third harmonic signal Vh2 is a third harmonic signal whose polarity is same as a polarity of the W-phase voltage command signal Vw at the timing when the absolute value of the signal level of the W-phase current Iw is minimum. Namely, the third harmonic signal Vh2 is a third harmonic signal whose polarity is same as the polarity of the phase voltage command signal in the desired phase at the timing when the signal level of the phase current in the desired phase is minimum.

In an example illustrated by the fourth graph in FIG. 4, (i) the absolute value of the signal level of the third harmonic signal Vh2 is maximum at the timing (see a black circle mark in FIG. 4) when the signal level of the U-phase current Iu is zero and (ii) the polarity of the signal level of the third harmonic signal Vh2 is same as the polarity of the U-phase voltage command signal Vu at the timing when the signal level of the U-phase current Iu is zero, for example. For example, (i) the absolute value of the signal level of the third harmonic signal Vh2 is maximum at the timing (see a black square mark in FIG. 4) when the signal level of the V-phase current Iv is zero and (ii) the polarity of the signal level of the third harmonic signal Vh2 is same as the polarity of the V-phase voltage command signal Vv at the timing when the signal level of the V-phase current Iv is zero in a same manner. For example, (i) the absolute value of the signal level of the third harmonic signal Vh2 is maximum at the timing (see a black triangle mark in FIG. 4) when the signal level of the W-phase current Iw is zero and (ii) the polarity of the signal level of the third harmonic signal Vh2 is same as the polarity of the W-phase voltage command signal Vw at the timing when the signal level of the W-phase current Iw is zero in a same manner.

The harmonic generating unit 155 may generate the third harmonic signal Vh2 by referring to the three-phase current value(s) that can be obtained as the feedback information from the inverter 13. For example, the harmonic generating unit 155 may generate the third harmonic signal Vh2 by shifting the phase of the basic signal of the third harmonic signal that is defined by the parameter(s) stored in the memory or the like in accordance with a phase of the three-phase current value(s). Alternatively, for example, the harmonic generating unit 155 may generate the third harmonic signal Vh2 by generating the basic signal of the third harmonic signal by dividing the three-phase current value(s) or the three-phase voltage command signal(s) and then shifting the phase of the basic signal in accordance with the phase of the three-phase current value(s).

Alternatively, when the two-phase/three-phase converting unit 154 generates the three-phase voltage command signals, the harmonic generating unit 155 can calculate a difference δ between the phase of the three-phase current values and the phase of the three-phase voltage command signals (for example, a difference between the phase at which the signal level of the three-phase current value in the desired phase is zero and the phase at which the signal level of the three-phase voltage command signal in the desired phase is zero). In this case, the harmonic generating unit 155 may generate the third harmonic signal Vh2 by shifting a phase of the third harmonic signal Vh1 by an amount that is determined on the basis of the difference δ of the phase. For example, the harmonic generating unit 155 may generate the third harmonic signal Vh2 by shifting the phase of the third harmonic signal Vh1 by "3×δ−90" degree (incidentally, a positive direction is assumed to be a direction of the above described difference δ of the phase (namely, a direction from a phase position at which the signal level of the three-phase voltage command signal in the desired phase is zero toward a phase position at which the signal level of the three-phase current value in the desired phase is zero)). Alternatively, the harmonic generating unit 155 may generate the third harmonic signal Vh2 so that a phase position at which the signal level of the third harmonic signal Vh2 is zero is same as a phase position that is obtained by shifting a phase position at which the signal level of the three-phase voltage command signal is zero by the amount that is determined on the basis of the difference δ of the phase. For example, the harmonic generating unit 155 may generate the third harmonic signal Vh2 from the basic signal of the third harmonic signal or the like so that the phase position at which the signal level of the third harmonic signal Vh2 is zero is same as the phase position that is obtained by shifting the phase position at which the signal level of the three-phase voltage command signal is zero by "δ−30".

Incidentally, the third harmonic signal Vh2 may not be the third harmonic signal whose absolute value of the signal level is maximum at the timing when the absolute value of the signal level of three-phase current value is minimum. Specifically, the third harmonic signal Vh2 may be a third harmonic signal whose absolute value of the signal level is larger than zero at the timing when the absolute value of the signal level of three-phase current value is minimum. In other words, the third harmonic signal Vh2 may be a third harmonic signal whose absolute value of the signal level is not zero at the timing when the absolute value of the signal level of three-phase current value is minimum. However, even in this case, the third harmonic signal Vh2 is a third harmonic signal whose polarity is same as the polarity of the phase voltage command signal in the desired phase at the timing when the signal level of the phase current in the desired phase is minimum. In order to generate the third harmonic signal Vh2 whose absolute value of the signal level is larger than zero at the timing when the absolute value of the signal level of three-phase current value is minimum, the harmonic generating unit 155 may shift the phase of the third harmonic signal Vh1 by "3×δ−X (incidentally, 0<X<180)" degree. Alternatively, the harmonic generating unit 155 may generate the third harmonic signal Vh2 so that the phase position at which the signal level of the third harmonic signal Vh2 is zero is same as the phase position that is obtained by shifting the phase position at which the signal level of the three-phase voltage command signal is zero by "δ−X/3". Alternatively, in order to generate the third harmonic signal Vh2 whose absolute value of the signal level is larger than zero at the timing when the absolute value of the signal level of three-phase current value is minimum, the harmonic generating unit 155 may shift the phase of the third harmonic signal Vh2 (see the fourth graph in FIG. 4) whose absolute value of the signal level is maximum at the timing when the absolute value of the signal level of three-phase current value is minimum by "Y (incidentally, −90<Y<90)" degree. Incidentally, a fifth graph in FIG. 4 illustrate one example of the third harmonic signal Vh2 that is obtained by shifting the phase of the third harmonic signal Vh2 illustrated by the fourth graph in FIG. 4 by "Y1 (incidentally, 0<Y1<90)" degree. Moreover, a sixth graph in FIG. 4 illustrate one example of the third harmonic signal Vh2 that is obtained by shifting the phase of the third harmonic signal Vh2 illustrated by the fourth graph in FIG. 4 by "Y2 (incidentally, −90<Y2<0)" degree.

Again in FIG. 3, then, the PWM converting unit 157 generates the modulation signals by adding the third harmonic signal Vh1 that is generated at the step S12 to the three-phase voltage command signals that is generated at the step S11 (step S14). Specifically, the PWM converting unit 157 generates the U-phase modulation signal Vmu by adding the third harmonic signal Vh1 that is generated at the step S12 to the U-phase voltage command signal Vu that is generated at the step S11 (step S14). The PWM converting unit 157 generates the V-phase modulation signal Vmv by adding the third harmonic signal Vh1 that is generated at the step S12 to the V-phase voltage command signal Vv that is generated at the step S11, in a same manner (step S14). The PWM converting unit 157 generates the W-phase modulation signal Vmw by adding the third harmonic signal Vh1 that is generated at the step S12 to the W-phase voltage command signal Vw that is generated at the step S11, in a same manner (step S14).

Then, the PWM converting unit 157 determines whether or not there exists a period during which the absolute values of the signal levels of two of the U-phase modulation signal Vmu, V-phase modulation signal Vmv and W-phase modulation signal Vmw that are generated at the step S14 are larger than an absolute value of a peak value of the carrier signal C (step S15). Namely, the PWM converting unit 157 determines whether or not there exists a period during which the absolute values of the signal levels of the modulation signals in two phases are larger than the absolute value of the peak value of the carrier signal C.

Incidentally, if there exists the period during which the absolute values of the signal levels of the modulation signals in two phases are larger than the absolute value of the peak value of the carrier signal C, it is predicted that a modulation rate based on the modulation signals that are generated at the step S14 (namely, a modulation rate when the inverter 13 is driven by using the modulation signals that are generated at the step S14) is relatively large. This is because there is a correlation between the modulation rate and a percentage of the period during which the modulation signal is larger than the carrier signal. Therefore, the PWM converting unit 157 may determines whether or not the modulation rate based on the modulation signals that are generated at the step S14 is equal to or larger than a predetermined value, in addition to or instead of determining whether or not there exists the period during which the absolute values of the signal levels of the modulation signals in two phases are larger than the absolute value of the peak value of the carrier signal C As a result of the determination at the step S15, if it is determined that there does not exist the period during which the absolute values of the signal levels of the modulation signals in two phases are larger than the absolute value of the peak value of the carrier signal C (step S15: No), the adder 156u adds the third harmonic signal Vh1 that is generated at the step S12 and the third harmonic signal Vh2 that is generated at the step S13 to the U-phase voltage command signal Vu that is generated at the step S11. As a result, the adder 156u generates the U-phase modulation signal Vmu (=Vu+Vh1+Vh2) (step S16). The adder 156v also generates the V-phase modulation signal Vmv (=Vv+Vh1+Vh2) in a same manner (step S16). The adder 156w also generates the W-phase modulation signal Vmw (=Vw+Vh1+Vh2) in a same manner (step S16).

Then, the PWM converting unit 157 generates the PWM signals (namely, the U-phase PWM signals Gup and Gun, the V-phase PWM signal Gyp and Gvn and the W-phase PWM signals Gwp and Gwn) on the basis of the magnitude relation between the modulation signals that are generated at the step S16 and the carrier signal C (step S17). Specifically, the PWM converting unit 157 generates the U-phase PWM signals Gup and Gun on the basis of the magnitude relation between the U-phase modulation signal Vmu and the carrier signal C (step S17). The PWM converting unit 157 generates the V-phase PWM signals Gyp and Gvn on the basis of the magnitude relation between the V-phase modulation signal Vmv and the carrier signal C, in a same manner (step S17).

The PWM converting unit 157 generates the W-phase PWM signals Gwp and Gwn on the basis of the magnitude relation between the W-phase modulation signal Vmw and the carrier signal C, in a same manner (step S17).

Figure 5:
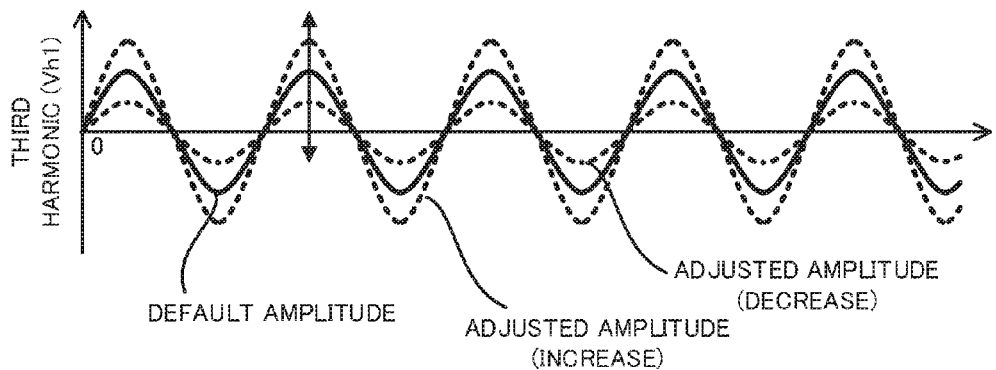
FIG. 5 is a graph illustrating an adjustment aspect of the third harmonic signal.

On the other hand, as a result of the determination at the step S15, if it is determined that there exists the period during which the absolute values of the signal levels of the modulation signals in two phases are larger than the absolute value of the peak value of the carrier signal C (step S15: Yes), the harmonic generating unit 155 adjusts the amplitude of the third harmonic signal Vh1 (step S18). For example, as illustrated in FIG. 5, the harmonic generating unit 155 changes the amplitude of the third harmonic signal Vh1 from a default amplitude to a desired amplitude. Namely, the harmonic generating unit 155 generates the third harmonic signal Vh1 whose amplitude is the desired amplitude that is different from the default amplitude (hereinafter, the third harmonic signal Vh1 whose amplitude is adjusted is referred to as the "third harmonic signal Vh1*"). More specifically, the harmonic generating unit 155 may change the amplitude of the third harmonic signal Vh1 to the desired amplitude that is larger than the default amplitude. Alternatively, the harmonic generating unit 155 may change the amplitude of the third harmonic signal Vh1 to the desired amplitude that is smaller than the default amplitude.

Figure 6:
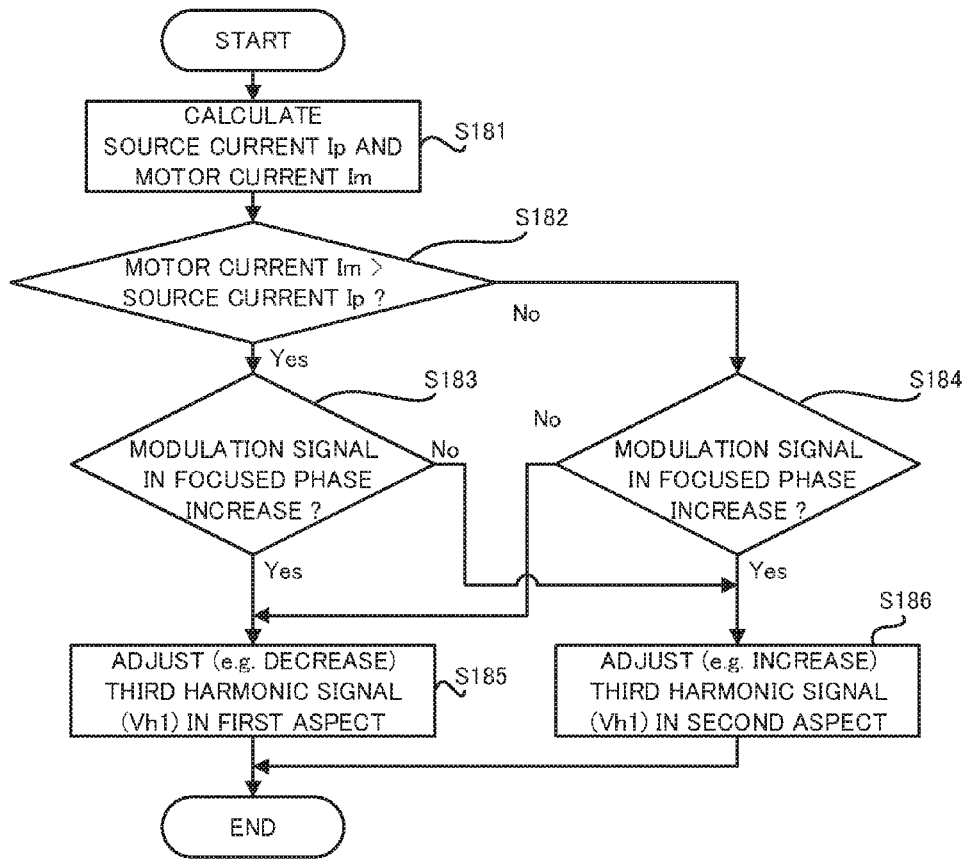
FIG. 6 is a flowchart illustrating a flow of the operation of adjusting the amplitude of the third harmonic signal at the step S18 in FIG. 3.

Here, with reference to FIG. 6, an operation of adjusting the amplitude of the third harmonic signal Vh1 at the step S18 in FIG. 3 will be explained in detail. FIG. 6 is a flowchart illustrating a flow of the operation of adjusting the amplitude of the third harmonic signal Vh1 at the step S18 in FIG. 3

As illustrated in FIG. 6, the harmonic generating unit 155 calculates each of source current Ip and motor current Im (step S181).

The "source current Ip" means current that flows between the DC power source 11 and the smoothing condenser 12 (more preferably, current that flows into the smoothing condenser 12 from the DC power source 11). The harmonic generating unit 155 may calculate the source current Ip by using a formula of "source current Ip=(rotating speed of the motor generator 14×the torque of the motor generator 14+loss in the inverter 13)/the voltage VH between the terminals", for example. In this case, the harmonic generating unit 155 preferably obtains or calculates parameter(s) that directly or indirectly represents the rotating speed of the motor generator 14, the torque of the motor generator 14, the loss in the inverter 13 and the voltage VH between the terminals. However, the harmonic generating unit 155 may calculate the source current Ip by using another method.

The "motor current Im" means current that flows between the smoothing condenser 12 and the motor generator 14 (more preferably, current that flows into the motor generator 14 from the smoothing condenser 12). The motor current Im is same as the phase current in one phase whose switching state is different from that in each of the other two phases among the three phases. For example, the motor current Im is same as the phase current in the phase among the U-phase, the V-phase and the W-phase in which the p-side switching element is turned on solely or current that is obtained by inverting sign of the phase current in the phase in which the p-side switching element is turned off solely. Specifically, for example, if the p-side switching element Qup in the U-phase arm and the p-side switching element Qwp in the W-phase arm are turned off and the p-side switching element Qvp in the V-phase arm is turned on, the V-phase current Iv itself is the motor current Im. For example, if the p-side switching element Qup in the U-phase arm and the p-side switching element Qwp in the W-phase arm are turned on and the p-side switching element Qvp in the V-phase arm is turned off, a current (namely, −Iv)) that is obtained by inverting the sign of the V-phase current Iv is the motor current Im.

Then, the harmonic generating unit 155 determines magnitude relation between the motor current Im and the source current Ip (step S182). For example, the harmonic generating unit 155 determines whether or not the motor current Im is larger than the source current Ip.

In addition to the determination at the step S182, the harmonic generating unit 155 determines a variation aspect of the modulation signal in one phase (hereinafter, it is referred to as a "focuses phase") among the three phases that is to be focused in adjusting the amplitude of the third harmonic signal Vh1 (step S183 and step S184). For example, the harmonic generating unit 155 determines whether or not the modulation signal in the focused phase increases.

Incidentally, the "focused phase" means a phase of the modulation signal that is not larger than the peak value of the carrier signal C among the modulation signals that are generated at the step S14 in FIG. 3. Specifically, considering that the phases of the modulation signals in the three-phase AC are shifted by 120 degree from one another, if the absolute values of the signal levels of the modulation signals in two phases are larger than the absolute value of the peak value of the carrier signal C (step S15 in FIG. 3: Yes), the absolute value of the signal level of the modulation signal in the other one phase is supposed not to be larger than the absolute value of the peak value of the carrier signal C. In this case, the other one phase is the focused phase.

As a result of the determinations at the step S182 to the step S184, if it is determined that the motor current Im is larger than the source current Ip and the modulation signal in the focused phase increases (step S182: Yes, step S183: Yes), the harmonic generating unit 155 adjusts the amplitude of the third harmonic signal Vh1 in a first adjusting aspect (step S185). For example, the harmonic generating unit 155 may adjust the amplitude of the third harmonic signal Vh1 to decrease the amplitude (see FIG. 12 that is described later in detail).

As a result of the determinations at the step S182 to the step S184, if it is determined that the motor current Im is larger than the source current Ip and the modulation signal in the focused phase decreases (namely, does not increase) (step S182: Yes, step S183: No), the harmonic generating unit 155 adjusts the amplitude of the third harmonic signal Vh1 in a second adjusting aspect (step S186). For example, the harmonic generating unit 155 may adjust the amplitude of the third harmonic signal Vh1 to increase the amplitude (see FIG. 9 that is described later in detail).

As a result of the determinations at the step S182 to the step S184, if it is determined that the motor current Im is smaller (namely, is not larger) than the source current Ip and the modulation signal in the focused phase increases (step S182: No, step S184: Yes), the harmonic generating unit 155 adjusts the amplitude of the third harmonic signal Vh1 in the second adjusting aspect (step S186). For example, the harmonic generating unit 155 may adjust the amplitude of the third harmonic signal Vh1 to increase the amplitude (see FIG. 10 that is described later in detail).

As a result of the determinations at the step S182 to the step S184, if it is determined that the motor current Im is smaller than the source current Ip and the modulation signal in the focused phase decreases (step S182: No, step S184: No), the harmonic generating unit 155 adjusts the amplitude of the third harmonic signal Vh1 in the first adjusting aspect (step S185). For example, the harmonic generating unit 155 may adjust the amplitude of the third harmonic signal Vh1 to decrease the amplitude (see FIG. 11 that is described later in detail).

Namely, in the present embodiment, the harmonic generating unit 155 decides the adjusting aspect of the third harmonic signal Vh1 on the basis of the variation aspect of the modulation signal in the focused phase (namely, the other one phase in which the absolute value of the signal level is not larger than the absolute value of the peak value of the carrier signal C) and the magnitude relation between the motor current Im and the source current Ip.

Again in FIG. 3, then, the adder 156$u$ adds the third harmonic signal Vh1* whose amplitude is adjusted at the step S18 to the U-phase voltage command signal Vu that is generated at the step S11. As a result, the adder 156$u$ generates the U-phase modulation signal Vmu (=Vu+Vh1*) (step S19). The adder 156$v$ also generates the V-phase modulation signal Vmv (=Vv+Vh1*) in a same manner (step S19). The adder 156$w$ also generates the W-phase modulation signal Vmw (=Vv+Vh1*) in a same manner (step S19).

Then, the PWM converting unit 157 generates the PWM signals (namely, the U-phase PWM signals Gup and Gun, the V-phase PWM signal Gyp and Gvn and the W-phase PWM signals Gwp and Gwn) on the basis of the magnitude relation between the modulation signals that are generated at the step S19 and the carrier signal C (step S17).

Figure 8:
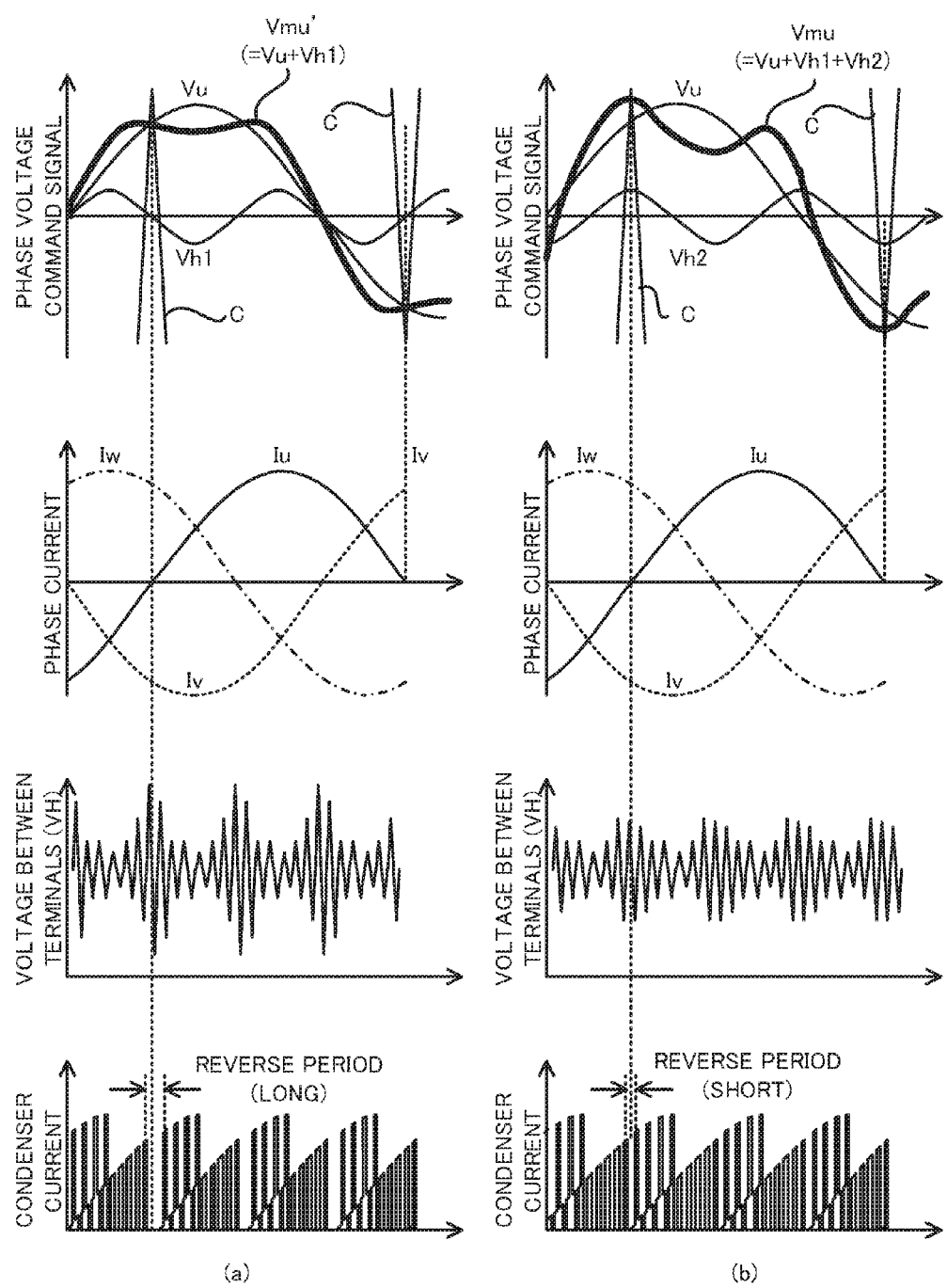
FIG. 8 includes graphs illustrating the ripple that occurs when the third harmonic signal is added to each three-phase voltage command signal while comparing the ripple that occurs when the third harmonic signal is not added to each three-phase voltage command signal.

As described above, in the present embodiment, if there does not exist the period during which the absolute values of the signal levels of the modulation signals in two phases are larger than the absolute value of the peak value of the carrier signal C, the third harmonic signal Vh2 as well as the third harmonic signal Vh1 whose amplitude is not adjusted are added to each three-phase voltage command signal. As a result, ripple of the voltage VH between the terminals of the smoothing condenser 12 is suppressed appropriately, compared to the case where in inverter control operation in a comparison example that does not use the above described third harmonic signal Vh2. More specifically, occurrence of the relatively large ripple at the timing when the absolute value of the signal level of the three-phase current value is minimum (typically, zero) is suppressed appropriately. Hereinafter, with reference to FIG. 7 and FIG. 8, its reason will be explained. FIG. 7 includes graphs and block diagram for explaining the reason why the relatively large ripple occurs at the timing when the absolute value of the signal level of the three-phase current value is minimum (typically, zero). FIG. 8 includes graphs illustrating the ripple that occurs when the third harmonic signal Vh2 is added to each three-phase voltage command signal while comparing the ripple that occurs when the third harmonic signal Vh2 is not added to each three-phase voltage command signal.

As illustrated in FIG. 7($a$), the ripple of the voltage VH between the terminals of the smoothing condenser 12 is relatively large at the timing when the absolute value of the signal level of each of the U-phase current Iu, the V-phase current Iv and the W-phase current Iw is minimum (zero in an example illustrated in FIG. 7). In the following explanation, the timing when the signal level of the U-phase current Iu is zero is focused for the explanation. However, same applies to the timing when the signal level of the V-phase current Iv is zero and the timing when the signal level of the W-phase current Iw is zero.

As illustrated in a first graph in FIG. 7($a$), the V-phase current Iv and the W-phase current Iw have a relation that the absolute value of the signal level of the V-phase current Iv is close to or almost or generally same as the absolute value of the signal level of the W-phase current Iw at or around the timing when the signal level of the U-phase current Iu is zero. In addition, the V-phase current Iv and the W-phase current Iw have a relation that the polarity of the V-phase current Iv is opposite to the polarity of the W-phase current Iw at the timing when the signal level of the U-phase current Iu is zero. As a result, as illustrated in FIG. 7(b), most part or almost all of the current that flows in the inverter 13 (for example, the current that flows from the motor generator 14 to the inverter 13 and the current that flows from the inverter 13 to the motor generator 14) returns from the motor generator 14 to the motor generator 14 through the V-phase arm and the W-phase arm of the inverter 13. Namely, the inverter 13 substantially operates in a reverse mode most part or almost all of the current that flows from the motor generator 14 to the inverter 13 returns to the motor generator 14 as it is. When the inverter 13 operates in the above described reverse mode, condenser current (namely, the current that flows through the smoothing condenser 12) is zero or a value that is close to zero (see a third graph in FIG. 7(a)). When the inverter 13 operates in the reverse mode, most part or almost all of the DC electrical power that is supplied from the DC power source 11 is supplied to the smoothing condenser 12. As a result, the voltage VH between the terminals of the smoothing condenser 12 increases easily.

Therefore, it is expected that it is preferable to shorten a period during which the inverter 13 operates in the reverse mode, in order to suppress the ripple of the voltage VII between the terminals that occurs at the timing when the signal level of each of the U-phase current Iu, the V-phase current Iv and the W-phase current Iw is zero. Thus, in the present embodiment, the ECU 15 allows the inverter 13 to operate by using the U-phase modulation signal Vmu, the V-phase modulation signal Vmv and the W-phase modulation signal Vmw that are generated by adding the third harmonic signal Vh2 in order to shorten the period during which the inverter 13 operates in the reverse mode.

Here, the third harmonic signal Vh2 has a property that the absolute value of its signal level is maximum (or is larger than zero) at the timing when the signal level of each of the U-phase current Iu, the V-phase current Iv and the W-phase current Iw is zero. Furthermore, the third harmonic signal Vh2 has a property that its polarity is same as the polarity of the phase voltage command signal in a certain phase at the timing when the absolute value of the signal level of the phase current in the certain phase is minimum.

Therefore, as illustrated in a first graph in FIG. 8(b), the absolute value of the signal level of the U-phase modulation signal Vmu that is generated by adding the third harmonic signal Vh2 to the U-phase voltage command signal Vu is larger than the absolute value of the signal level of the U-phase voltage command signal Vu at the timing when the signal level of the U-phase current Iu is zero. Incidentally, although there is no illustration in the drawing for the purpose of simple illustration, the absolute value of the signal level of the V-phase modulation signal Vmv that is generated by adding the third harmonic signal Vh2 to the V-phase voltage command signal Vv is larger than the absolute value of the signal level of the V-phase voltage command signal Vv at the timing when the signal level of the V-phase current Iv is zero. Similarly, although there is no illustration in the drawing for the purpose of simple illustration, the absolute value of the signal level of the W-phase modulation signal Vmw that is generated by adding the third harmonic signal Vh2 to the W-phase voltage command signal Vw is larger than the absolute value of the signal level of the W-phase voltage command signal Vw at the timing when the signal level of the W-phase current Iw is zero.

On the other hand, as illustrated in a first graph in FIG. 8(a), the absolute value of the signal level of the U-phase modulation signal Vmu that is generated without adding the third harmonic signal Vh2 is not larger than the absolute value of the signal level of the U-phase voltage command signal Vu at the timing when the signal level of the U-phase current Iu is zero, under the assumption that the amplitude of the third harmonic signal Vh1 is not adjusted as described later. Incidentally, although there is no illustration in the drawing for the purpose of simple illustration, the absolute value of the signal level of the V-phase modulation signal Vmv that is generated without adding the third harmonic signal Vh2 is not larger than the absolute value of the signal level of the V-phase voltage command signal Vv at the timing when the signal level of the V-phase current Iv is zero, under the assumption that the amplitude of the third harmonic signal Vh1 is not adjusted as described later. Similarly, although there is no illustration in the drawing for the purpose of simple illustration, the absolute value of the signal level of the W-phase modulation signal Vmw that is generated without adding the third harmonic signal Vh2 is not larger than the absolute value of the signal level of the W-phase voltage command signal Vw at the timing when the signal level of the W-phase current Iw is zero, under the assumption that the amplitude of the third harmonic signal Vh1 is not adjusted as described later.

As a result, as illustrated in the first graph in each of FIG. 8(a) and FIG. 8(b), a period during which the U-phase modulation signal Vmu is smaller than the carrier signal C at the timing when the signal level of the U-phase current Iu is zero is shortened (however, in the case where the polarity of the U-phase modulation signal Vmu is positive) in the case where the third harmonic signal Vh2 is added, compared to the case where the third harmonic signal Vh2 is not added. Alternatively, a period during which the U-phase modulation signal Vmu is larger than the carrier signal C at the timing when the signal level of the U-phase current Iu is zero is shortened (however, in the case where the polarity of the U-phase modulation signal Vmu is negative). If the period during which the U-phase modulation signal Vmu is smaller or larger than the carrier signal C is shortened, the switching state of each switching element that causes the inverter 13 to operate in the reverse mode is changed. Namely, if the period during which the U-phase modulation signal Vmu is smaller or larger than the carrier signal C is shortened, the period during which the inverter 13 operates in the reverse mode is shortened (see a fourth graph in each of FIG. 8(a) and FIG. 8(b)). Therefore, as illustrated in a third graph in each of FIG. 8(a) and FIG. 8(b), the ripple of the voltage VH between the terminals that may occur at the timing when the signal level of the U-phase current Iu is zero is suppressed appropriately in the case where the third harmonic signal Vh2 is added, compared to the case where the third harmonic signal Vh2 is not added. Incidentally, the ripple of the voltage VH between the terminals that may occur at the timing when the signal level of each of the V-phase current Iv and the W-phase current Iw is zero is also suppressed appropriately for the same reason.

Incidentally, FIG. 8(b) illustrates the voltage VH between the terminals and the condenser current in the case where the third harmonic signal Vh2 whose absolute value of the signal level is maximum at the timing when the signal level of each three-phase current value is zero is used. However, it is needless to say that same technical effect can be achieved to some extent even when using the third harmonic signal Vh2 whose absolute value of the signal level is larger than zero (however, is not maximum) at the timing when the signal level of each three-phase current value is zero. Namely, it is needless to say that same technical effect can be achieved to some extent even when using the third harmonic signal Vh2 that is obtained by shifting, by Y degree (−90<Y<90), the phase of the third harmonic signal Vh2 (see the first graph in FIG. 8(b)) whose absolute value of the signal level is maximum at the timing when the signal level of each three-phase current value is zero. For example, the period during which the inverter 13 operates in the reverse mode is shortened to some extent even when using the third harmonic signal Vh2 that is obtained by shifting, by Y1 degree (0<Y1<90), the phase of the harmonic signal Vh2 illustrated in the first graph in FIG. 8(b), and as a result, the ripple of the voltage VH between the terminals is suppressed to some extent. Similarly, for example, the period during which the inverter 13 operates in the reverse mode is shortened to some extent even when using the third harmonic signal Vh2 that is obtained by shifting, by Y2 degree (−90<Y2<0), the phase of the harmonic signal Vh2 illustrated in the first graph in FIG. 8(b), and as a result, the ripple of the voltage VH between the terminals is suppressed to some extent.

Moreover, considering the technical effect that is achieved by the third harmonic signal Vh2, the third harmonic signal Vh2 is a third harmonic signal having a property to function for making the absolute value of the signal level of the modulation signal in a certain phase larger than the absolute value of the signal level of the phase voltage command signal in the certain phase at the timing when the absolute value of the signal level of the phase current in the certain phase is minimum. Namely, the third harmonic signal Vh2 is a third harmonic signal having a property to function for making the absolute value of the signal level of the U-phase modulation signal Vmu larger than the absolute value of the signal level of the U-phase voltage command signal Vu at the timing when the absolute value of the signal level of the U-phase current Iu is minimum. Similarly, the third harmonic signal Vh2 is a third harmonic signal having a property to function for making the absolute value of the signal level of the V-phase modulation signal Vmv larger than the absolute value of the signal level of the V-phase voltage command signal Vv at the timing when the absolute value of the signal level of the V-phase current Iv is minimum. Similarly, the third harmonic signal Vh2 is a third harmonic signal having a property to function for making the absolute value of the signal level of the W-phase modulation signal Vmw larger than the absolute value of the signal level of the W-phase voltage command signal Vw at the timing when the absolute value of the signal level of the W-phase current Iw is minimum. Therefore, the third harmonic signal Vh2 is not limited to the third harmonic signal illustrated in FIG. 4 and may be any signal as long as it is the third harmonic signal that has the above described property.

Figure 9:
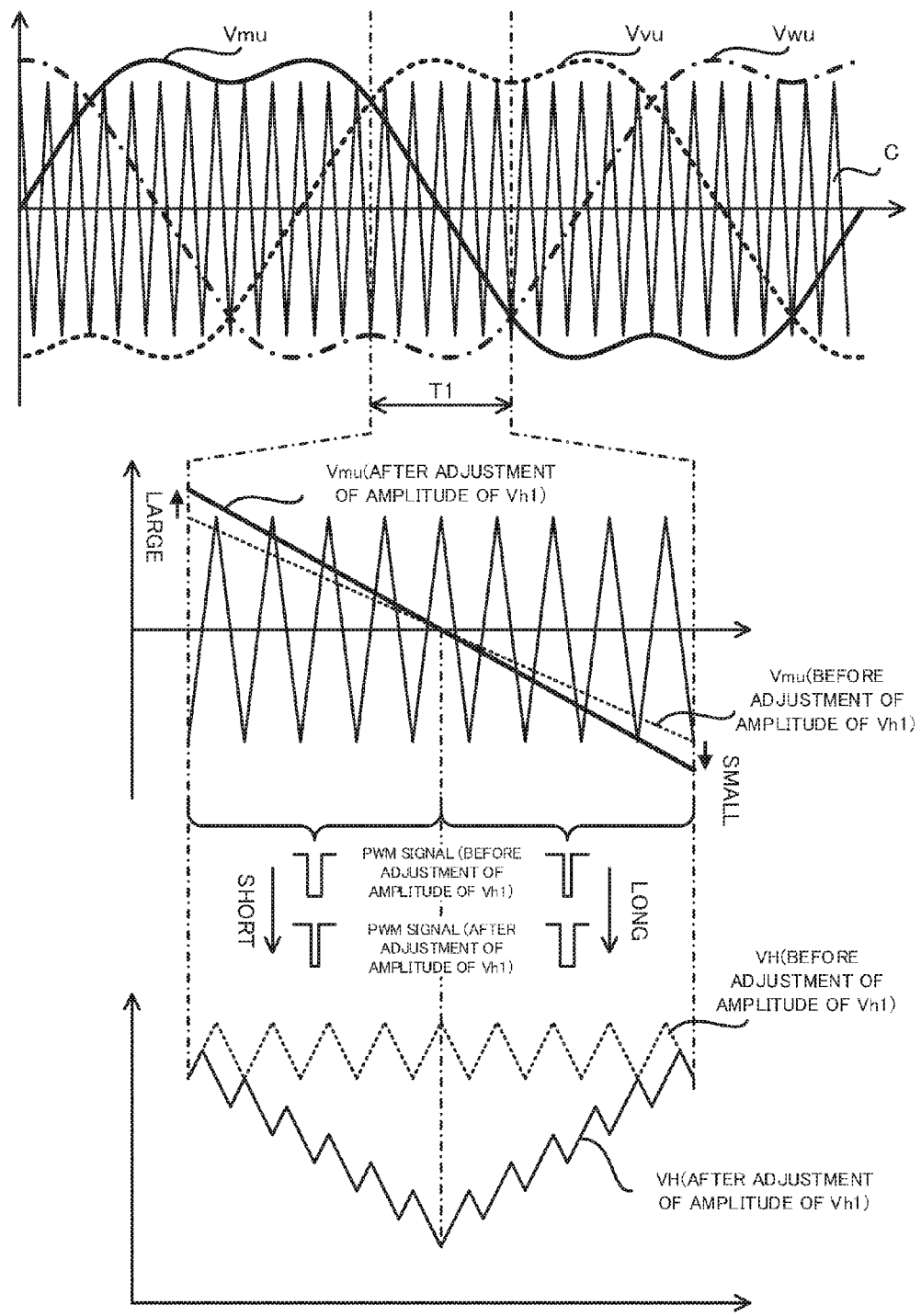
FIG. 9 includes graphs illustrating an influence of the adjustment of the amplitude of the third harmonic signal on the voltage between the terminals of the smoothing condenser.
Figure 10:
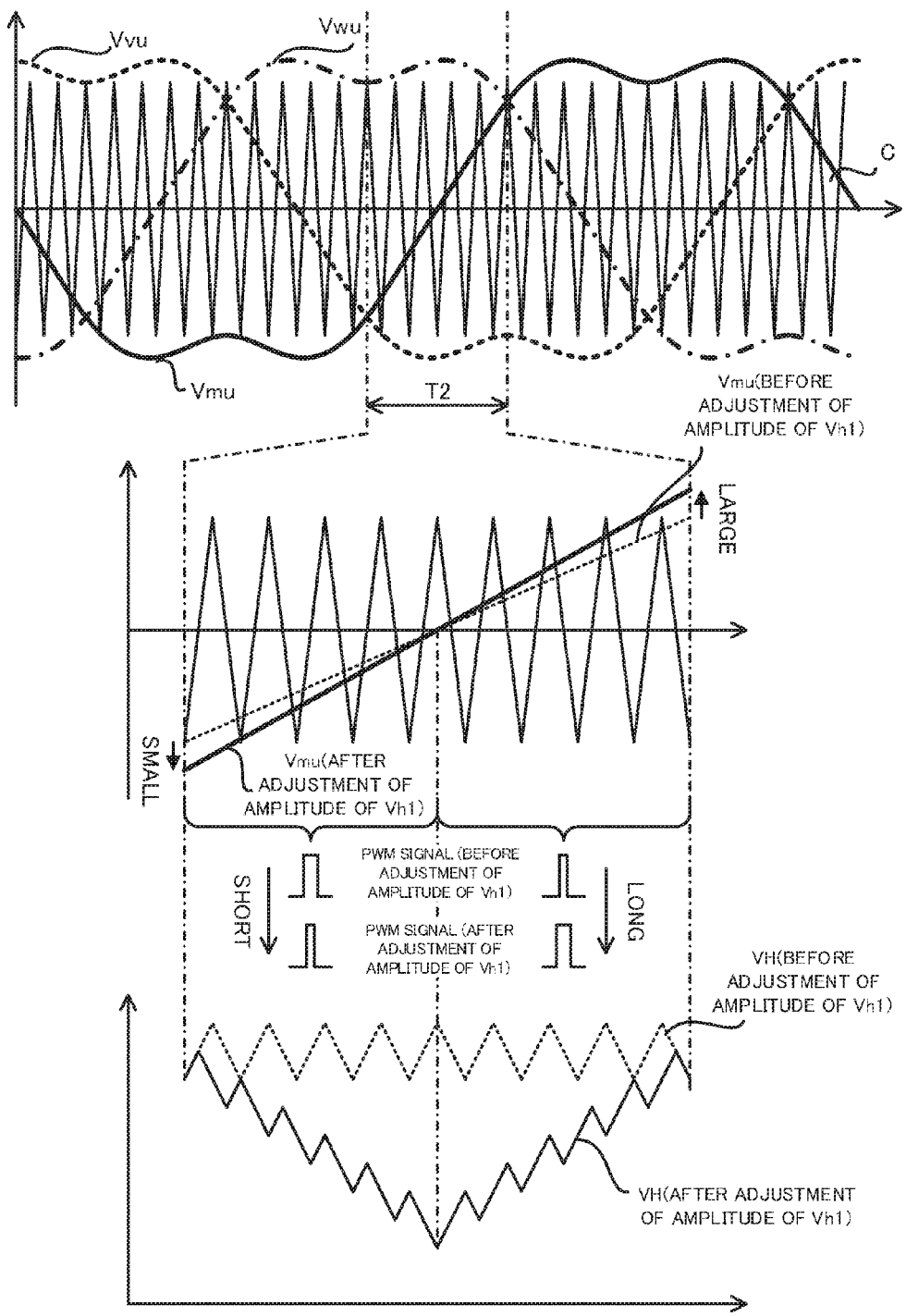
FIG. 10 includes graphs illustrating an influence of the adjustment of the amplitude of the third harmonic signal on the voltage between the terminals of the smoothing condenser.
Figure 11:
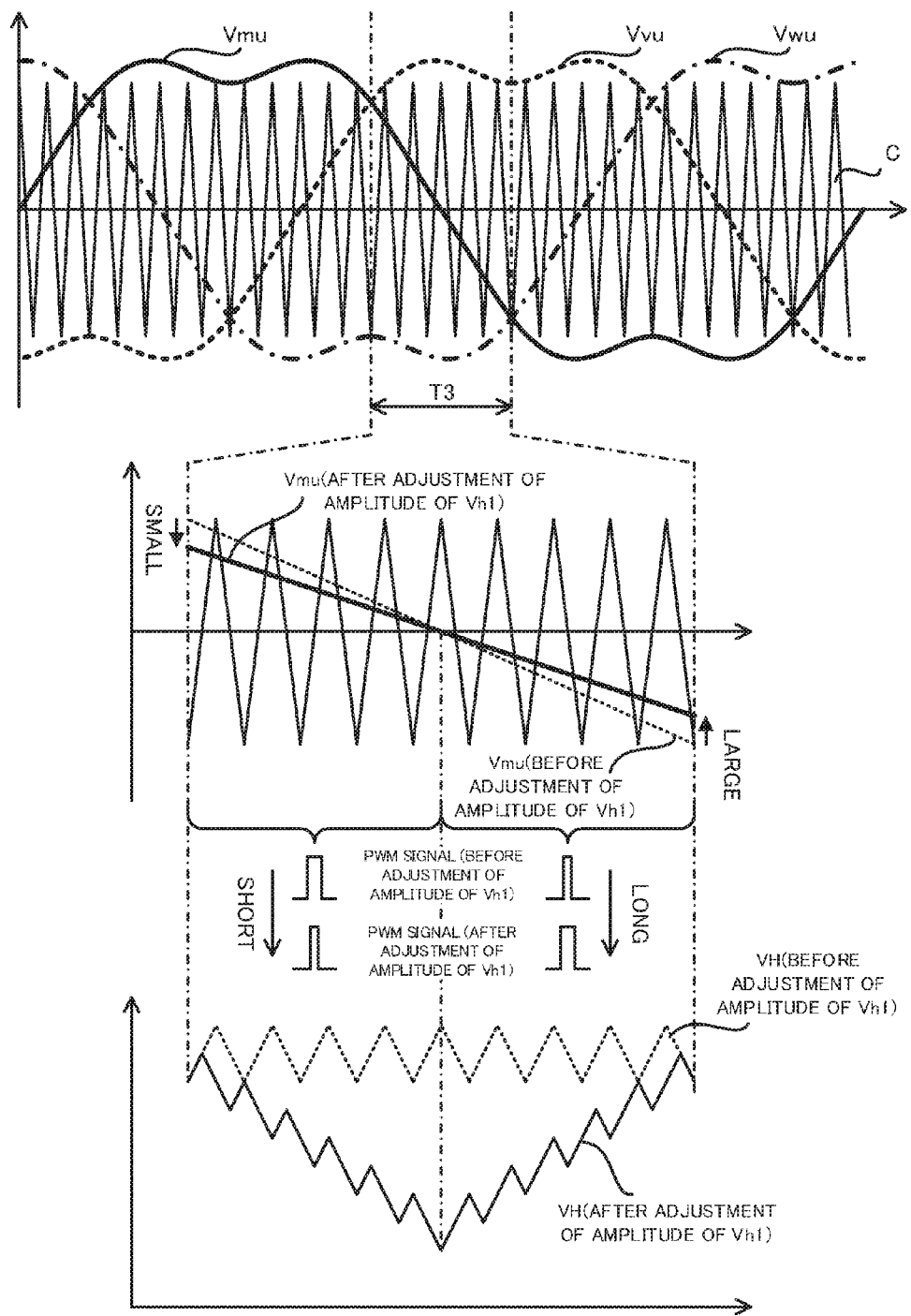
FIG. 11 includes graphs illustrating an influence of the adjustment of the amplitude of the third harmonic signal on the voltage between the terminals of the smoothing condenser.
Figure 12:
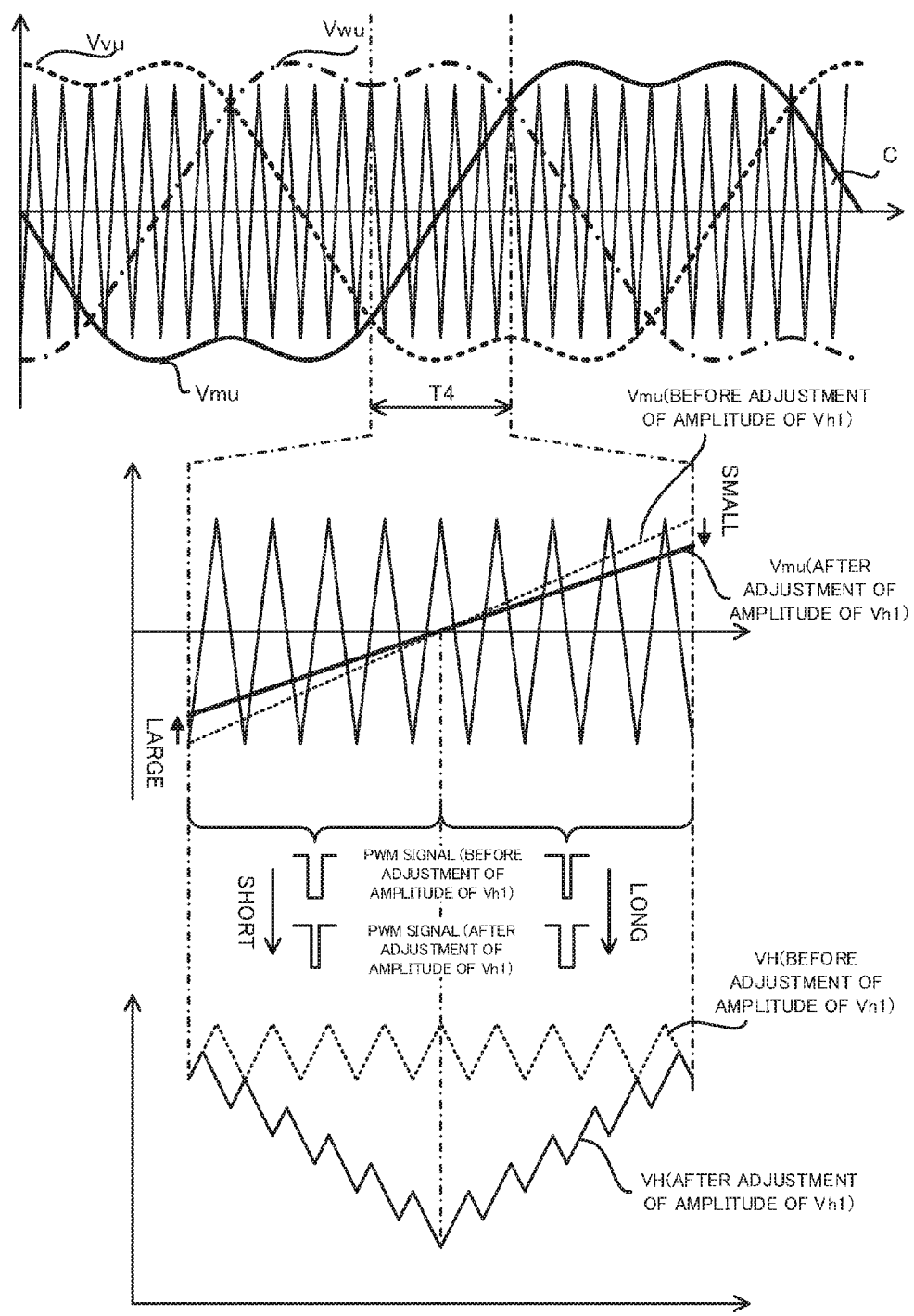
FIG. 12 includes graphs illustrating an influence of the adjustment of the amplitude of the third harmonic signal on the voltage between the terminals of the smoothing condenser.
Figure 13:
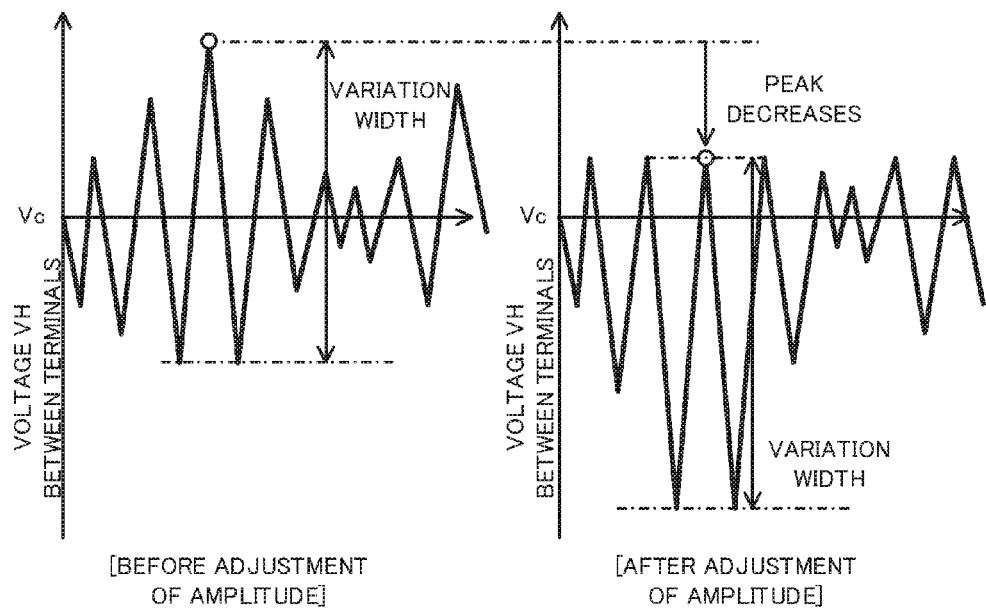
FIG. 13 includes graphs illustrating an influence of the adjustment of the amplitude of the third harmonic signal on the voltage between the terminals of the smoothing condenser.

On the other hand, in the present embodiment, if there exists the period during which the absolute values of the signal levels of the modulation signals in two phases are larger than the absolute value of the peak value of the carrier signal C, the third harmonic signal Vh2 is not necessarily added to the three-phase voltage command signal while the third harmonic signal Vh1 whose amplitude is adjusted is added to the three-phase voltage command signal. As a result, the ripple of the voltage VH between the terminals of the smoothing condenser 12 is suppressed appropriately even in the case where the modulation rate in the inverter 13 is relatively large, compared to an inverter control operation in a comparison example that does not adjusts the amplitude of the third harmonic signal Vh1 and does not use the above described third harmonic signal Vh2. Hereinafter, with reference to FIG. 9 to FIG. 13, its reason will be explained. FIG. 9 includes graphs illustrating an influence of the adjustment of the amplitude of the third harmonic signal Vh1 on the voltage VH1 between the terminals of the smoothing condenser 12. FIG. 10 includes graphs illustrating an influence of the adjustment of the amplitude of the third harmonic signal Vh1 on the voltage VH1 between the terminals of the smoothing condenser 12. FIG. 11 includes graphs illustrating an influence of the adjustment of the amplitude of the third harmonic signal Vh1 on the voltage VH1 between the terminals of the smoothing condenser 12. FIG. 12 includes graphs illustrating an influence of the adjustment of the amplitude of the third harmonic signal Vh1 on the voltage VH1 between the terminals of the smoothing condenser 12. FIG. 13 includes graphs illustrating an influence of the adjustment of the amplitude of the third harmonic signal Vh1 on the voltage VH1 between the terminals of the smoothing condenser 12.

Firstly, as described above, the present embodiment uses the modulation signal that is obtained by adding the third harmonic signals Vh1 and Vh2 to the three-phase voltage command signal in order to control the operation of the inverter 13, Thus, the possibility that the modulation signal that is obtained by adding both of the third harmonic signals Vh1 and Vh2 to the three-phase voltage command signal is larger than the peak value of the carrier signal C (namely, larger than the maximum value or smaller than the minimum value) is relatively higher, compared to the case of the modulation signal that is obtained by adding only the third harmonic signal Vh1 to the three-phase voltage command signal. Namely, the absolute value of the signal level of the modulation signal is larger than the absolute value of the peak value of the carrier signal C more easily in the case where the modulation signal is generated by adding both of the third harmonic signals Vh1 and Vh2 to the three-phase voltage command signal, compared to the case where the modulation signal is generated by adding only the third harmonic signal Vh1 to the three-phase voltage command signal.

On the other hand, the modulation rate in the inverter 13 is preferably equal to or smaller than a predetermined limit value which is determined in accordance with specifications of the inverter 13, the motor generator 14 and the vehicle 15, in order to appropriately control the motor generator 14. However, the modulation rate becomes larger in the case where the modulation signal is generated by adding not only the third harmonic signal Vh1 but also the third harmonic signal Vh2 to the three-phase voltage command signal, compared to the case where the modulation signal is generated by adding only the third harmonic signal Vh1 to the three-phase voltage command signal. In this case, there is a possibility that the modulation rate is larger than the predetermined limit value if the third harmonic signals Vh1 and Vh2 are added to the three-phase voltage command signal. Therefore, the requirement that the modulation rate is preferably equal to or smaller than the predetermined limit value may make it difficult to add the third harmonic signal Vh2 to the three-phase voltage command signal in the case where the modulation rate is relatively large (for example, larger than a predetermined value). Therefore, when the modulation rate is relatively large, it is desired to suppress the ripple of the voltage VH between the terminals by using a method that is different from the method of adding the third harmonic signal Vh2 to the three-phase voltage command signal.

So, we consider the different method. As described above, when the modulation rate is relatively large, the absolute value of the signal level of the modulation signal (namely, the three-phase voltage command signal+third harmonic signal Vh1) in each of two phases is often larger than the absolute value of the peak value of the carrier signal C. Here, considering that the phases of the modulation signals in the three-phase AC are shifted by 120 degree from one another, even if the absolute value of the signal level of the modulation signal in each of two phases is larger than the absolute value of the peak value of the carrier signal C, the absolute value of the signal level of the modulation signal in the other one phase is supposed not to be larger than the absolute value of the peak value of the carrier signal C. In this case, the operation of the inverter 13 (namely, the operation of the motor generator 14) substantially depends on the modulation signal in the other one phase (namely, the above described focused phase) whose absolute value of the signal level is not larger than the absolute value of the peak value of the carrier signal C. Therefore, it is expected that the ripple of the voltage VH between the terminals of the smoothing condenser 12 can be controlled by adjusting property of the modulation signal in the other one phase (namely, the above described focused phase) whose absolute value of the signal level is not larger than the absolute value of the peak value of the carrier signal C.

Thus, in the present embodiment, the harmonic generating unit 155 adjusts the amplitude of the third harmonic signal Vh1 in order to adjust the property of the modulation signal in the focused phase that is the other one phase under the condition where the absolute value of the signal level of the modulation signal in each of two phases is larger than the absolute value of the peak value of the carrier signal C. The adjustment of the amplitude of the third harmonic signal Vh1 results in variation of the signal level of the modulation signal in the focused phase. The variation of the signal level of the modulation signal in the focused phase results in variation of the magnitude relation between the modulation signal in the focused phase and the carrier signal C. The variation of the magnitude relation between the modulation signal in the focused phase and the carrier signal C results in change of the operation aspect of the inverter 13. The change of the operation aspect of the inverter 13 results in change of the variation aspect of the voltage VH between the terminals of the smoothing condenser 12. Thus, if the harmonic generating unit 155 appropriately adjusts the amplitude of the third harmonic signal Vh1, the ripple of the voltage VH between the terminals of the smoothing condenser 12 is controlled.

Specifically, the harmonic generating unit 155 preferably adjusts the amplitude of the third harmonic signal Vh1 from a below described point of view in order to control the ripple of the voltage VH between the terminals of the smoothing condenser 12.

Firstly, as illustrated in FIG. 9, a period T1 is focused. In the period T1, as illustrated in a first graph in FIG. 9, the absolute value of the signal level of each of the V-phase modulation signal Vmv (=V-phase voltage command signal Vv+third harmonic signal Vh1) and the W-phase modulation signal Vmw W-phase voltage command signal Vw+third harmonic signal Vh1) is larger than the absolute value of the peak value of the carrier signal C. Moreover, in the period T1, as illustrated in the first graph in FIG. 9, the U-phase modulation signal Vmu (=U-phase voltage command signal Vu+third harmonic signal Vh1) decreases monotonously. Moreover, in the period T1, the motor current Im is assumed to be larger than the source current Ip.

In the above described period T1, the p-side switching element Gyp in the V-phase arm keeps being in an ON state and the p-side switching element Gwp in the W-phase arm keeps being in an OFF state. Considering that the motor current Im is larger than the source current Ip under these switching conditions in the V-phase arm and the W-phase arm, the voltage VH between the terminals of the switching condenser 12 increases if the p-side switching element Gup in the U-phase arm is turned off in the period T1. In other words, the voltage VH between the terminals of the switching condenser 12 decreases if the p-side switching element Gup in the U-phase arm is turned on in the period T1.

In this case, the harmonic generating unit 155 adjusts the amplitude of the third harmonic signal Vh1 so that magnitude relation between the U-phase modulation signal Vmu before the adjustment of the amplitude of the third harmonic signal Vh1 (hereinafter, it is referred to as a "before-amplitude-adjustment U-phase modulation signal Vmu", see a dashed line in a second graph in FIG. 9) and the U-phase modulation signal Vmu after the adjustment of the amplitude of the third harmonic signal Vh1 (hereinafter, it is referred to as a "after-amplitude-adjustment U-phase modulation signal Vmu", see a solid line in the second graph in FIG. 9) is in a specific state. Specifically, the harmonic generating unit 155 adjusts the amplitude of the third harmonic signal Vh1 so that the magnitude relation between the before-amplitude-adjustment U-phase modulation signal Vmu and the after-amplitude-adjustment U-phase modulation signal Vmu changes from a state where the after-amplitude-adjustment U-phase modulation signal Vmu is larger than the before-amplitude-adjustment U-phase modulation signal Vmu to a state where the after-amplitude-adjustment U-phase modulation signal Vmu is smaller than the before-amplitude-adjustment U-phase modulation signal Vmu, for example.

In an example illustrated in the second graph in FIG. 9, a border point between the state where the after-amplitude-adjustment U-phase modulation signal Vmu is larger than the before-amplitude-adjustment U-phase modulation signal Vmu and the state where the after-amplitude-adjustment U-phase modulation signal Vmu is smaller than the before-amplitude-adjustment U-phase modulation signal Vmu is a point at which the signal level of the U-phase modulation signal Vmu is zero. In this case, the harmonic generating unit 155 typically increases the amplitude of the third harmonic signal Vh1 to increase the absolute value of the signal level of the U-phase modulation signal Vmu. Namely, the harmonic generating unit 155 increases the amplitude of the third harmonic signal Vh1 so that the absolute value of the signal level of the after-amplitude-adjustment U-phase modulation signal Vmu is larger than the absolute value of the signal level of the before-amplitude-adjustment U-phase modulation signal Vmu.

Incidentally, in the period T1 illustrated in FIG. 9, it is determined that the motor current Im is larger than the source current Ip and the modulation signal in the focused phase decreases (step S182 in FIG. 6: Yes and step S183 in FIG. 6: No). Therefore, the harmonic generating unit 155 adjusts the amplitude of the third harmonic signal Vh1 to increase the amplitude in the period T1 (step S186 in FIG. 6). Thus, the harmonic generating unit 155 can adjust the amplitude of the third harmonic signal Vh1 in the period T1 so that the magnitude relation between the before-amplitude-adjustment U-phase modulation signal Vmu and the after-amplitude-adjustment U-phase modulation signal Vmu changes from the state where the after-amplitude-adjustment U-phase modulation signal Vmu is larger than the before-amplitude-adjustment U-phase modulation signal Vmu to the state where the after-amplitude-adjustment U-phase modulation signal Vmu is smaller than the before-amplitude-adjustment U-phase modulation signal Vmu.

As a result, as illustrated in a third graph in FIG. 9, a period during which the U-phase modulation signal Vmu is smaller than the carrier signal C becomes relatively short due to the adjustment of the amplitude of the third harmonic signal Vh1 under the condition where the after-amplitude-adjustment U-phase modulation signal Vmu is larger than the before-amplitude-adjustment U-phase modulation signal Vmu (namely, in a region that is at a left side of the point at which the signal level of the U-phase modulation signal Vmu is zero). Namely, a period during which the PWM signal is at low level (namely, a period during which the p-side switching element Gup is in the OFF state, and a period during which the voltage VH between the terminals increases) becomes relatively short due to the adjustment of the amplitude of the third harmonic signal Vh1. Therefore, as illustrated in a fourth graph in FIG. 9, the voltage VH between the terminals decreases more easily in the case where the amplitude of the third harmonic signal Vh1 is adjusted, compared to the case where the amplitude of the third harmonic signal Vh1 is not adjusted.

On the other hand, as illustrated in the third graph in FIG. 9, the period during which the U-phase modulation signal Vmu is smaller than the carrier signal C becomes long due to the adjustment of the amplitude of the third harmonic signal Vh1 under the condition where the after-amplitude-adjustment U-phase modulation signal Vmu is smaller than the before-amplitude-adjustment U-phase modulation signal Vmu (namely, in a region that is at a right side of the point at which the signal level of the U-phase modulation signal Vmu is zero). Namely, the period during which the PWM signal is at low level becomes long due to the adjustment of the amplitude of the third harmonic signal Vh1. Therefore, as illustrated in the fourth graph in FIG. 9, the voltage VH between the terminals increases more easily in the case where the amplitude of the third harmonic signal Vh1 is adjusted, compared to the case where the amplitude of the third harmonic signal Vh1 is not adjusted.

As a result, as illustrated in the fourth graph in FIG. 9, waveform of the voltage VH between the terminals becomes a waveform that is convex downward (namely, projects to a side toward which the voltage VH between the terminals decreases) more easily in the case where the amplitude of the third harmonic signal Vh1 is adjusted, compared to the case where the amplitude of the third harmonic signal Vh1 is not adjusted. Specifically, in an example illustrated in the fourth graph in FIG. 9, the voltage VH between the terminals becomes relatively small around the point at which the signal level of the U-phase modulation signal Vmu is zero. As a result, the peak value of the voltage VH between the terminals decreases easily.

On the other hand, even if the amplitude of the third harmonic signal Vh1 increases in the period T1, the magnitude relation between the carrier signal C and each of the V-phase modulation signal Vmv and the W-phase modulation signal Vmw rarely or never changes. This is because the absolute value of the signal level of each of the V-phase modulation signal Vmv and the W-phase modulation signal Vmw is still larger than the absolute value of the peak value of the carrier signal C regardless of the increasing of the amplitude of the third harmonic signal Vh1. Therefore, the adjustment of the amplitude of the third harmonic signal Vh1 rarely or never changes the magnitude relation between the carrier signal C and the V-phase modulation signal Vmv or the W-phase modulation signal Vmw to a state that increases the voltage VH between the terminals (namely, changes to a state that is contrary to the purpose). For example, the adjustment of the amplitude of the third harmonic signal Vh1 rarely or never changes the magnitude relation between the carrier signal C and the U-phase modulation signal Vmu to a state that decreases the voltage VH between the terminals and the magnitude relation between the carrier signal C and the V-phase modulation signal Vmv to the state that increases the voltage VH between the terminals. In this sense, it is advantageous to adjust the amplitude of the third harmonic signal Vh1 in the period during which the absolute values of the signal levels of the modulation signals in two-phases are larger than the absolute value of the peak value of the carrier signal C.

Next, as illustrated in FIG. 10, a period T2 is focused. In the period T2, as illustrated in a first graph in FIG. 10, the absolute value of the signal level of each of the V-phase modulation signal Vmv and the W-phase modulation signal Vmw is larger than the absolute value of the peak value of the carrier signal C. Moreover, in the period T2, as illustrated in the first graph in FIG. 10, the U-phase modulation signal Vmu increases monotonously. Moreover, in the period T2, the source current Ip is assumed to be larger than the motor current Im.

The above described period T2 is different from the period T1 illustrated in FIG. 9 in that the switching state in each of the V-phase arm and the W-phase arm is inverted. Thus, in the period T2, the p-side switching element Gyp in the V-phase arm keeps being in the OFF state and the p-side switching element Gwp in the W-phase arm keeps being in the ON state. Considering that the source current Ip is larger than the motor current Im under these switching conditions in the V-phase arm and the W-phase arm, the voltage VH between the terminals of the switching condenser 12 increases if the p-side switching element Gup in the U-phase arm is turned on in the period T2. In other words, the voltage VH between the terminals of the switching condenser 12 decreases if the p-side switching element Gup in the U-phase arm is turned off in the period T2.

In this case, the harmonic generating unit 155 adjusts the amplitude of the third harmonic signal Vh1 so that the magnitude relation between the before-amplitude-adjustment U-phase modulation signal Vmu (see a dashed line in a second graph in FIG. 10) and the after-amplitude-adjustment U-phase modulation signal Vmu (see a solid line in the second graph in FIG. 10) is in a specific state. Specifically, the harmonic generating unit 155 adjusts the amplitude of the third harmonic signal Vh1 so that the magnitude relation between the before-amplitude-adjustment U-phase modulation signal Vmu and the after-amplitude-adjustment U-phase modulation signal Vmu changes from the state where the after-amplitude-adjustment U-phase modulation signal Vmu is smaller than the before-amplitude-adjustment U-phase modulation signal Vmu to the state where the after-amplitude-adjustment U-phase modulation signal Vmu is larger than the before-amplitude-adjustment U-phase modulation signal Vmu.

In an example illustrated in the second graph in FIG. 10, the border point between the state where the after-amplitude-adjustment U-phase modulation signal Vmu is smaller than the before-amplitude-adjustment U-phase modulation signal Vmu and the state where the after-amplitude-adjustment U-phase modulation signal Vmu is larger than the before-amplitude-adjustment U-phase modulation signal Vmu is the point at which the signal level of the U-phase modulation signal Vmu is zero. In this case, the harmonic generating unit 155 typically increases the amplitude of the third harmonic signal Vh1 to increase the absolute value of the signal level of the U-phase modulation signal Vmu. Namely, the harmonic generating unit 155 increases the amplitude of the third harmonic signal Vh1 so that the absolute value of the signal level of the after-amplitude-adjustment U-phase modulation signal Vmu is larger than the absolute value of the signal level of the before-amplitude-adjustment U-phase modulation signal Vmu.

Incidentally, in the period T2 illustrated in FIG. 10, it is determined that the motor current Im is smaller than the source current Ip and the modulation signal in the focused phase increases (step S182 in FIG. 6: No and step S184 in FIG. 6: Yes). Therefore, the harmonic generating unit 155 adjusts the amplitude of the third harmonic signal Vh1 to increase the amplitude in the period T2 (step S186 in FIG. 6). Thus, the harmonic generating unit 155 can adjust the amplitude of the third harmonic signal Vh1 in the period T2 so that the magnitude relation between the before-amplitude-adjustment U-phase modulation signal Vmu and the after-amplitude-adjustment U-phase modulation signal Vmu changes from the state where the after-amplitude-adjustment U-phase modulation signal Vmu is smaller than the before-amplitude-adjustment U-phase modulation signal Vmu to the state where the after-amplitude-adjustment U-phase modulation signal Vmu is larger than the before-amplitude-adjustment U-phase modulation signal Vmu.

As a result, as illustrated in a third graph in FIG. 10, a period during which the U-phase modulation signal Vmu is larger than the carrier signal C becomes relatively short due to the adjustment of the amplitude of the third harmonic signal Vh1 under the condition where the after-amplitude-adjustment U-phase modulation signal Vmu is smaller than the before-amplitude-adjustment U-phase modulation signal Vmu (namely, in a region that is at a left side of the point at which the signal level of the U-phase modulation signal Vmu is zero). Namely, a period during which the PWM signal is at high level (namely, a period during which the p-side switching element Gup is in the ON state, and the period during which the voltage VH between the terminals increases) becomes relatively short due to the adjustment of the amplitude of the third harmonic signal Vh1. Therefore, as illustrated in a fourth graph in FIG. 10, the voltage VH between the terminals decreases more easily in the case where the amplitude of the third harmonic signal Vh1 is adjusted, compared to the case where the amplitude of the third harmonic signal Vh1 is not adjusted.

On the other hand, as illustrated in the third graph in FIG. 10, the period during which the U-phase modulation signal Vmu is larger than the carrier signal C becomes long due to the adjustment of the amplitude of the third harmonic signal Vh1 under the condition where the after-amplitude-adjustment U-phase modulation signal Vmu is larger than the before-amplitude-adjustment U-phase modulation signal Vmu (namely, in a region that is at a right side of the point at which the signal level of the U-phase modulation signal Vmu is zero). Namely, the period during which the PWM signal is at high level becomes long due to the adjustment of the amplitude of the third harmonic signal Vh1. Therefore, as illustrated in the fourth graph in FIG. 10, the voltage VH between the terminals increases more easily in the case where the amplitude of the third harmonic signal Vh1 is adjusted, compared to the case where the amplitude of the third harmonic signal Vh1 is not adjusted.

As a result, as illustrated in the fourth graph in FIG. 10, the waveform of the voltage VH between the terminals becomes the waveform that is convex downward more easily in the case where the amplitude of the third harmonic signal Vh1 is adjusted, compared to the case where the amplitude of the third harmonic signal Vh1 is not adjusted. Specifically, in an example illustrated in the fourth graph in FIG. 10, the voltage VH between the terminals becomes relatively small around the point at which the signal level of the U-phase modulation signal Vmu is zero. As a result, the peak value of the voltage VH between the terminals decreases easily.

On the other hand, even if the amplitude of the third harmonic signal Vh1 increases in the period T2, the magnitude relation between the carrier signal C and each of the V-phase modulation signal Vmv and the W-phase modulation signal Vmw rarely or never changes, as with the period T1.

Next, as illustrated in FIG. 11, a period T3 is focused. In the period T3, as illustrated in a first graph in FIG. 11, the absolute value of the signal level of each of the V-phase modulation signal Vmv and the W-phase modulation signal Vmw is larger than the absolute value of the peak value of the carrier signal C. Moreover, in the period T3, as illustrated in the first graph in FIG. 11, the U-phase modulation signal Vmu decreases monotonously. Moreover, in the period T3, the source current Ip is assumed to be larger than the motor current Im.

The above described period T3 is different from the period T1 illustrated in FIG. 9 in that the magnitude relation between the source current Ip and the motor current Im is inverted. Thus, the voltage VH between the terminals of the switching condenser 12 increases if the p-side switching element Gup in the U-phase arm is turned on in the period T3. In other words, the voltage VH between the terminals of the switching condenser 12 decreases if the p-side switching element Gup in the U-phase arm is turned off in the period T3.

In this case, the harmonic generating unit 155 adjusts the amplitude of the third harmonic signal Vh1 so that the magnitude relation between the before-amplitude-adjustment U-phase modulation signal Vmu (see a dashed line in a second graph in FIG. 11) and the after-amplitude-adjustment U-phase modulation signal Vmu (see a solid line in the second graph in FIG. 11) is in a specific state. Specifically, the harmonic generating unit 155 adjusts the amplitude of the third harmonic signal Vh1 so that the magnitude relation between the before-amplitude-adjustment U-phase modulation signal Vmu and the after-amplitude-adjustment U-phase modulation signal Vmu changes from the state where the after-amplitude-adjustment U-phase modulation signal Vmu is smaller than the before-amplitude-adjustment U-phase modulation signal Vmu to the state where the after-amplitude-adjustment U-phase modulation signal Vmu is larger than the before-amplitude-adjustment U-phase modulation signal Vmu.

In an example illustrated in the second graph in FIG. 11, the border point between the state where the after-amplitude-adjustment U-phase modulation signal Vmu is smaller than the before-amplitude-adjustment U-phase modulation signal Vmu and the state where the after-amplitude-adjustment U-phase modulation signal Vmu is larger than the before-amplitude-adjustment U-phase modulation signal Vmu is the point at which the signal level of the U-phase modulation signal Vmu is zero. In this case, the harmonic generating unit 155 typically decreases the amplitude of the third harmonic signal Vh1 to decrease the absolute value of the signal level of the U-phase modulation signal Vmu. Namely, the harmonic generating unit 155 decreases the amplitude of the third harmonic signal Vh1 so that the absolute value of the signal level of the after-amplitude-adjustment U-phase modulation signal Vmu is smaller than the absolute value of the signal level of the before-amplitude-adjustment U-phase modulation signal Vmu.

Incidentally, in the period T3 illustrated in FIG. 11, it is determined that the motor current Im is smaller than the source current Ip and the modulation signal in the focused phase decreases (step S182 in FIG. 6: No and step S184 in FIG. 6: No). Therefore, the harmonic generating unit 155 adjusts the amplitude of the third harmonic signal Vh1 to decrease the amplitude in the period T3 (step S185 in FIG. 6). Thus, the harmonic generating unit 155 can adjust the amplitude of the third harmonic signal Vh1 in the period T3 so that the magnitude relation between the before-amplitude-adjustment U-phase modulation signal Vmu and the after-amplitude-adjustment U-phase modulation signal Vmu changes from the state where the after-amplitude-adjustment U-phase modulation signal Vmu is smaller than the before-amplitude-adjustment U-phase modulation signal Vmu to the state where the after-amplitude-adjustment U-phase modulation signal Vmu is larger than the before-amplitude-adjustment U-phase modulation signal Vmu.

As a result, as illustrated in a third graph in FIG. 11, a period during which the U-phase modulation signal Vmu is larger than the carrier signal C becomes relatively short due to the adjustment of the amplitude of the third harmonic signal Vh1 under the condition where the after-amplitude-adjustment U-phase modulation signal Vmu is smaller than the before-amplitude-adjustment U-phase modulation signal Vmu (namely, in a region that is at a left side of the point at which the signal level of the U-phase modulation signal Vmu is zero). Namely, a period during which the PWM signal is at high level (namely, a period during which the p-side switching element Gup is in the ON state, and the period during which the voltage VH between the terminals increases) becomes relatively short due to the adjustment of the amplitude of the third harmonic signal Vh1. Therefore, as illustrated in a fourth graph in FIG. 11, the voltage VH between the terminals decreases more easily in the case where the amplitude of the third harmonic signal Vh1 is adjusted, compared to the case where the amplitude of the third harmonic signal Vh1 is not adjusted.

On the other hand, as illustrated in the third graph in FIG. 11, the period during which the U-phase modulation signal Vmu is larger than the carrier signal C becomes long due to the adjustment of the amplitude of the third harmonic signal Vh1 under the condition where the after-amplitude-adjustment U-phase modulation signal Vmu is larger than the before-amplitude-adjustment U-phase modulation signal Vmu (namely, in a region that is at a right side of the point at which the signal level of the U-phase modulation signal Vmu is zero). Namely, the period during which the PWM signal is at high level becomes long due to the adjustment of the amplitude of the third harmonic signal Vh1. Therefore, as illustrated in the fourth graph in FIG. 11, the voltage VH between the terminals increases more easily in the case where the amplitude of the third harmonic signal Vh1 is adjusted, compared to the case where the amplitude of the third harmonic signal Vh1 is not adjusted.

As a result, as illustrated in the fourth graph in FIG. 11, the waveform of the voltage VH between the terminals becomes the waveform that is convex downward more easily in the case where the amplitude of the third harmonic signal Vh1 is adjusted, compared to the case where the amplitude of the third harmonic signal Vh1 is not adjusted. Specifically, in an example illustrated in the fourth graph in FIG. 11, the voltage VH between the terminals becomes relatively small around the point at which the signal level of the U-phase modulation signal Vmu is zero. As a result, the peak value of the voltage VH between the terminals decreases easily.

On the other hand, the harmonic generating unit 155 preferably decreases the amplitude of the third harmonic signal Vh1 so that the magnitude relation between the carrier signal C and each of the V-phase modulation signal Vmv and the W-phase modulation signal Vmw rarely or never changes in the period T3. This is because there is a possibility that the magnitude relation between the carrier signal C and each of the V-phase modulation signal Vmv and the W-phase modulation signal Vmw changes if the amplitude of the third harmonic signal Vh1 decreases too much. As a result, this is because there is a possibility that the magnitude relation between the carrier signal C and the V-phase modulation signal Vmv or the W-phase modulation signal Vmw changes to the state that increases the voltage VH between the terminals.

Next, as illustrated in FIG. 12, a period T4 is focused. In the period T4, as illustrated in a first graph in FIG. 12, the absolute value of the signal level of each of the V-phase modulation signal Vmv and the W-phase modulation signal Vmw is larger than the absolute value of the peak value of the carrier signal C. Moreover, in the period T4, as illustrated in the first graph in FIG. 12, the U-phase modulation signal Vmu increases monotonously. Moreover, in the period T4, the motor current Im is assumed to be larger than the source current Ip.

The above described period T4 is different from the period T1 illustrated in FIG. 9 in that the switching state in each of the V-phase arm and the W-phase arm is inverted and the magnitude relation between the source current Ip and the motor current Im is inverted. Thus, the voltage VH between the terminals of the switching condenser 12 increases if the p-side switching element Gup in the U-phase arm is turned off in the period T4. In other words, the voltage VH between the terminals of the switching condenser 12 decreases if the p-side switching element Gup in the U-phase arm is turned on in the period T4.

In this case, the harmonic generating unit 155 adjusts the amplitude of the third harmonic signal Vh1 so that the magnitude relation between the before-amplitude-adjustment U-phase modulation signal Vmu (see a dashed line in a second graph in FIG. 12) and the after-amplitude-adjustment U-phase modulation signal Vmu (see a solid line in the second graph in FIG. 12) is in a specific state. Specifically, the harmonic generating unit 155 adjusts the amplitude of the third harmonic signal Vh1 so that the magnitude relation between the before-amplitude-adjustment U-phase modulation signal Vmu and the after-amplitude-adjustment U-phase modulation signal Vmu changes from the state where the after-amplitude-adjustment U-phase modulation signal Vmu is larger than the before-amplitude-adjustment U-phase modulation signal Vmu to the state where the after-amplitude-adjustment U-phase modulation signal Vmu is smaller than the before-amplitude-adjustment U-phase modulation signal Vmu.

In an example illustrated in the second graph in FIG. 12, the border point between the state where the after-amplitude-adjustment U-phase modulation signal Vmu is larger than the before-amplitude-adjustment U-phase modulation signal Vmu and the state where the after-amplitude-adjustment U-phase modulation signal Vmu is smaller than the before-amplitude-adjustment U-phase modulation signal Vmu is the point at which the signal level of the U-phase modulation signal Vmu is zero. In this case, the harmonic generating unit 155 typically decreases the amplitude of the third harmonic signal Vh1 to decrease the absolute value of the signal level of the U-phase modulation signal Vmu. Namely, the harmonic generating unit 155 decreases the amplitude of the third harmonic signal Vh1 so that the absolute value of the signal level of the after-amplitude-adjustment U-phase modulation signal Vmu is smaller than the absolute value of the signal level of the before-amplitude-adjustment U-phase modulation signal Vmu.

Incidentally, in the period T4 illustrated in FIG. 12, it is determined that the motor current Im is larger than the source current Ip and the modulation signal in the focused phase increases (step S182 in FIG. 6: Yes and step S183 in FIG. 6: Yes). Therefore, the harmonic generating unit 155 adjusts the amplitude of the third harmonic signal Vh1 to decrease the amplitude in the period T4 (step S185 in FIG. 6). Thus, the harmonic generating unit 155 can adjust the amplitude of the third harmonic signal Vh1 in the period T4 so that the magnitude relation between the before-amplitude-adjustment U-phase modulation signal Vmu and the after-amplitude-adjustment U-phase modulation signal Vmu changes from the state where the after-amplitude-adjustment U-phase modulation signal Vmu is larger than the before-amplitude-adjustment U-phase modulation signal Vmu to the state where the after-amplitude-adjustment U-phase modulation signal Vmu is smaller than the before-amplitude-adjustment U-phase modulation signal Vmu.

As a result, as illustrated in a third graph in FIG. 11, a period during which the U-phase modulation signal Vmu is smaller than the carrier signal C becomes relatively short due to the adjustment of the amplitude of the third harmonic signal Vh1 under the condition where the after-amplitude-adjustment U-phase modulation signal Vmu is larger than the before-amplitude-adjustment U-phase modulation signal Vmu (namely, in a region that is at a left side of the point at which the signal level of the U-phase modulation signal Vmu is zero). Namely, a period during which the PWM signal is at low level (namely, a period during which the p-side switching element Gup is in the OFF state, and the period during which the voltage VH between the terminals increases) becomes relatively short due to the adjustment of the amplitude of the third harmonic signal Vh1. Therefore, as illustrated in a fourth graph in FIG. 12, the voltage VH between the terminals decreases more easily in the case where the amplitude of the third harmonic signal Vh1 is adjusted, compared to the case where the amplitude of the third harmonic signal Vh1 is not adjusted.

On the other hand, as illustrated in the third graph in FIG. 12, the period during which the U-phase modulation signal Vmu is smaller than the carrier signal C becomes relatively long due to the adjustment of the amplitude of the third harmonic signal Vh1 under the condition where the after-amplitude-adjustment U-phase modulation signal Vmu is smaller than the before-amplitude-adjustment U-phase modulation signal Vmu (namely, in a region that is at a right side of the point at which the signal level of the U-phase modulation signal Vmu is zero). Namely, the period during which the PWM signal is at low level becomes relatively long due to the adjustment of the amplitude of the third harmonic signal Vh1. Therefore, as illustrated in the fourth graph in FIG. 12, the voltage VH between the terminals increases more easily in the case where the amplitude of the third harmonic signal Vh1 is adjusted, compared to the case where the amplitude of the third harmonic signal Vh1 is not adjusted.

As a result, as illustrated in the fourth graph in FIG. 12, the waveform of the voltage VH between the terminals becomes the waveform that is convex downward (namely, projects to a side toward which the voltage VH between the terminals decreases) more easily in the case where the amplitude of the third harmonic signal Vh1 is adjusted, compared to the case where the amplitude of the third harmonic signal Vh1 is not adjusted. Specifically, in an example illustrated in the fourth graph in FIG. 12, the voltage VH between the terminals becomes relatively small around the point at which the signal level of the U-phase modulation signal Vmu is zero. As a result, the peak value of the voltage VH between the terminals decreases easily.

On the other hand, the harmonic generating unit 155 preferably decreases the amplitude of the third harmonic signal Vh1 so that the magnitude relation between the carrier signal C and each of the V-phase modulation signal Vmv and the W-phase modulation signal Vmw rarely or never changes in the period T2. This is because there is a possibility that the magnitude relation between the carrier signal C and each of the V-phase modulation signal Vmv and the W-phase modulation signal Vmw changes if the amplitude of the third harmonic signal Vh1 decreases too much. As a result, this is because there is a possibility that the magnitude relation between the carrier signal C and the V-phase modulation signal Vmv or the W-phase modulation signal Vmw changes to the state that increases the voltage VH between the terminals.

Incidentally, in FIG. 9 to FIG. 12, the U-phase modulation signal Vmu is focused for the explanation. However, same applies to the V-phase modulation signal Vmv and the W-phase modulation signal Vmw.

As a result of the above described adjustment of the amplitude of the third harmonic signal Vh1, the peak value of the voltage VH between the terminals (especially, the peak value of the ripple) decreases as illustrated in FIG. 13. Specifically, the ripple at a positive polarity side (namely, at a side that is larger than a target voltage Vc) decreases in the case where the target voltage Vc of the voltage VH between the terminals is regarded as zero level. Namely, variation width of the ripple at the positive polarity side decreases in the case where the target voltage Vc is regarded as the zero level. On the other hand, the ripple at a negative polarity side (namely, at a side that is smaller than the target voltage Vc) increases in the case where the target voltage Vc is regarded as the zero level. Namely, variation width of the ripple at the negative polarity side increases in the case where the target voltage Vc is regarded as the zero level. Moreover, variation width of whole of the ripple is substantially maintained. However, the variation width of whole of the ripple may increase or decrease in some cases. Anyway, in the present embodiment, the ripple of the voltage VH between the terminals is suppressed appropriately so that the peak value of the ripple of the voltage VH between the terminals becomes smaller.

Figure 14:
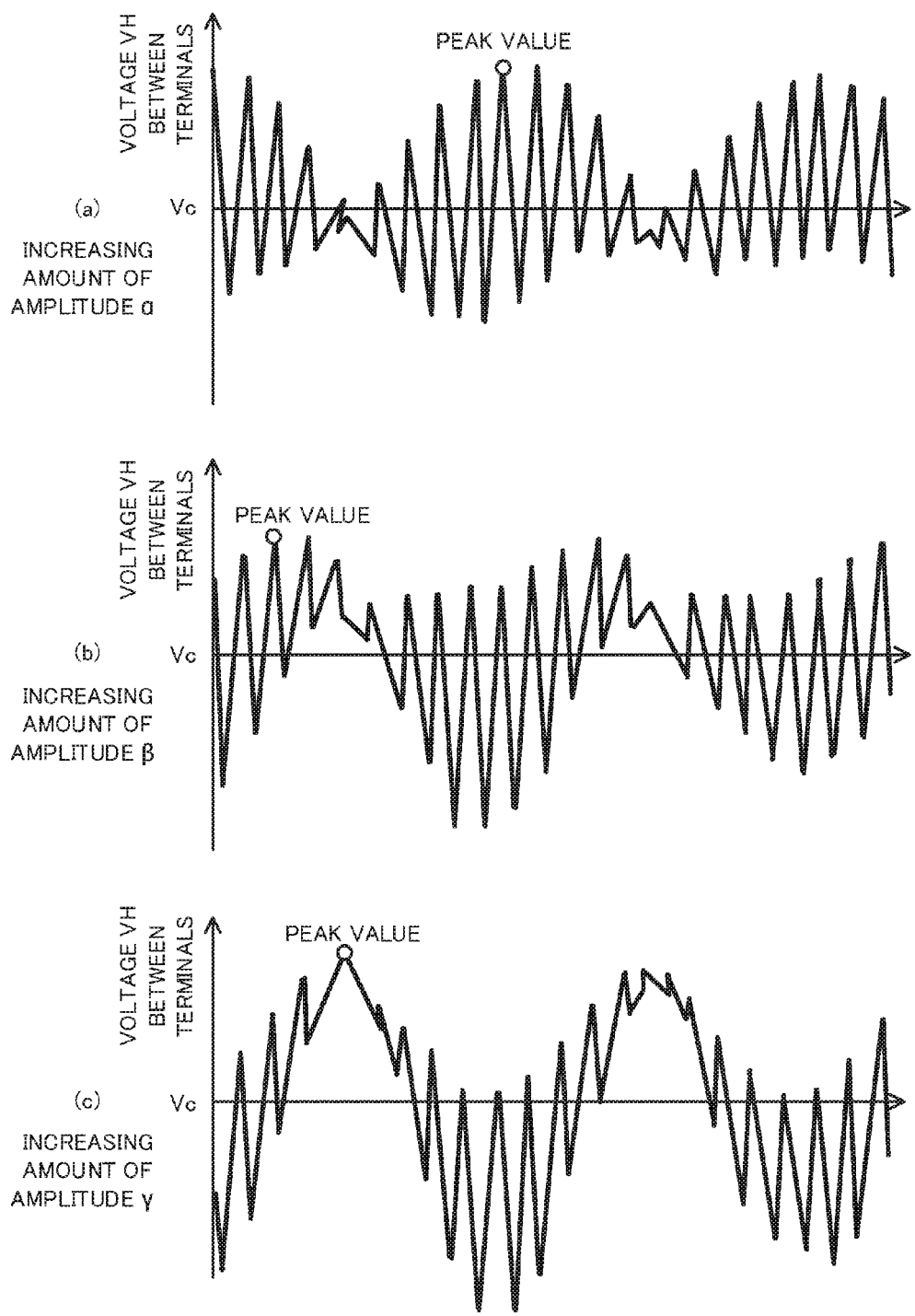
FIG. 14 includes graphs each illustrating relation between the adjusting amount of the amplitude of the third harmonic signal and the voltage between the terminals of the smoothing condenser.

Incidentally, decreasing aspect of the voltage VH between the terminals varies depending on an adjusting amount of the amplitude of the third harmonic signal Vh1. For example, FIG. 14($a$) illustrates the voltage VH between the terminals in the case where the increasing amount of the amplitude of the third harmonic signal Vh1 is $\alpha$. FIG. 14($b$) illustrates the voltage VH between the terminals in the case where the increasing amount of the amplitude of the third harmonic signal Vh1 is $\beta$ (incidentally, $\beta > \alpha$). FIG. 14($a$) illustrates the voltage VH between the terminals in the case where the increasing amount of the amplitude of the third harmonic signal Vh1 is γ (incidentally, γ>β). In examples illustrated in FIG. 14, the peak value of the voltage VH between the terminals is minimum in the case where the increasing amount of the amplitude of the third harmonic signal Vh1 is β. Therefore, the harmonic generating unit 155 preferably adjusts the amplitude of the third harmonic signal Vh1 so that the increasing amount of the amplitude of the third harmonic signal Vh1 is β.

In this case, the harmonic generating unit 155 may obtain, as feedback information, a detection result by a voltage meter for measuring the voltage VH between the terminals and may adjust the amplitude of the third harmonic signal Vh1 by performing a feedback control based on the obtained voltage VH between the terminals. Alternatively, if the a memory or the like stores a parameter that represents the amplitude of the third harmonic signal Vh1 that is adjusted in advance from the above described point of view, the harmonic generating unit 155 may adjust (alternatively, set) the amplitude of the third harmonic signal Vh1 by using the parameter that is stored in the memory or the like. Anyway, the inverter control operation using the amplitude of the third harmonic signal Vh1 that is adjusted dynamically (in other words, in real-time) or adjusted in advance from the above described point of view is within scope of the present invention.

Incidentally, in the above described explanation, the harmonic generating unit 155 adjusts the amplitude of the third harmonic signal Vh1. However, the harmonic generating unit 155 may adjust the phase of the third harmonic signal Vh1 in addition to or instead of the amplitude of the third harmonic signal Vh1. Even when the phase of the third harmonic signal Vh1 is adjusted, the above described effect can be achieved.

Figure 15:
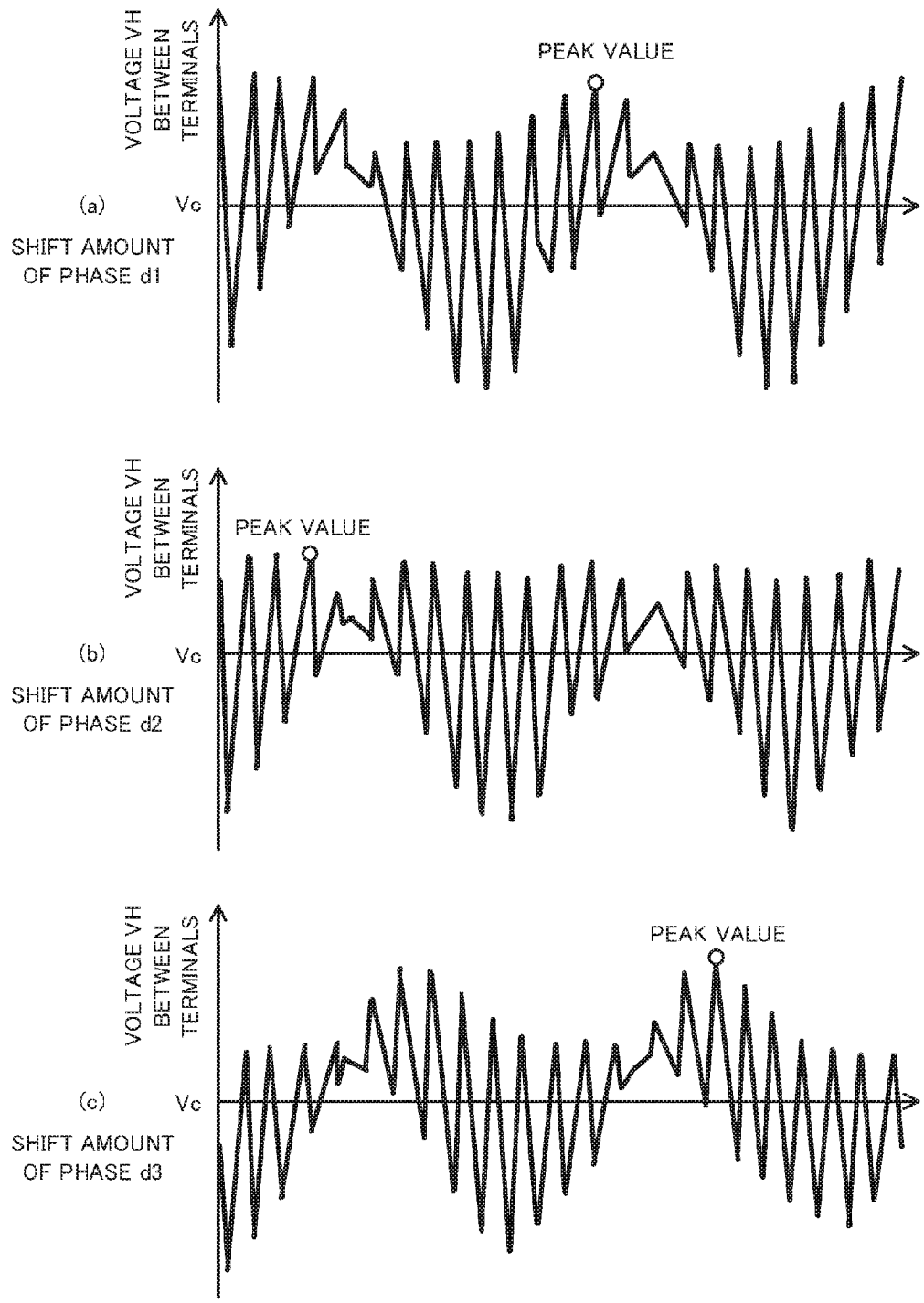
FIG. 15 includes graphs each illustrating relation between the adjusting amount of the phase of the third harmonic signal and the voltage between the terminals of the smoothing condenser.

Incidentally, when the phase of the third harmonic signal Vh1 is adjusted, the decreasing aspect of the voltage VH between the terminals varies depending on an adjusting amount of the phase of the third harmonic signal Vh1. For example, FIG. 15(a) illustrates the voltage VH between the terminals in the case where the adjusting amount of the phase of the third harmonic signal Vh1 is d1. FIG. 15(b) illustrates the voltage VH between the terminals in the case where the adjusting amount of the phase of the third harmonic signal Vh1 is d2 (incidentally, d2>d1). FIG. 15(c) illustrates the voltage VH between the terminals in the case where the adjusting amount of the phase of the third harmonic signal Vh1 is d3 (incidentally, d3>d2). In examples illustrated in FIG. 15, the peak value of the voltage VH between the terminals is minimum in the case where the adjusting amount of the phase of the third harmonic signal Vh1 is d2. Therefore, the harmonic generating unit 155 preferably adjusts the phase of the third harmonic signal Vh1 so that the adjusting amount of the phase of the third harmonic signal Vh1 is d2.

Moreover, the operation of adjusting the amplitude (alternatively, the phase) of the third harmonic signal Vh1 corresponds to the operation of adjusting the magnitude relation between the modulation signal and the carrier signal C. Thus, the PWM converting unit 157 may adjust the amplitude of the carrier signal C in addition or instead the harmonic generating unit 155 adjusts the amplitude (alternatively, the phase) of the third harmonic signal Vh1. Namely, the PWM converting unit 157 may adjust the amplitude of the carrier signal C to realize the states illustrated in FIG. 9 to FIG. 12. Even when the PWM converting unit 157 adjusts the amplitude of the carrier signal C, the above described effect can be achieved.

Moreover, in the above described explanation, the harmonic generating unit 155 adjusts the amplitude of the third harmonic signal Vh1, when there exists the period during which the absolute values of the signal levels of the modulation signals in two phases are larger than the absolute value of the peak value of the carrier signal C. However, the harmonic generating unit 155 may adjust the amplitude of the third harmonic signal Vh1, even when there does not exist the period during which the absolute values of the signal levels of the modulation signals in two phases are larger than the absolute value of the peak value of the carrier signal C. For example, the harmonic generating unit 155 may adjust the amplitude of the third harmonic signal Vh1 at all time or during a desired period. Even in this case, the above described effect can be achieved. However, in this case, there is high possibility that the ripples at both of the positive polarity side and the negative polarity side decreases in the case where the target voltage Vc is regarded as the zero level. Namely, there is high possibility that the variation width of whole of the ripple decreases. However, the ripple of the voltage VH between the terminals is still suppressed appropriately so that the peak value of the ripple of the voltage VH between the terminals decreases.

Incidentally, when the harmonic generating unit 155 adjusts the amplitude of the third harmonic signal Vh1 at all time or during the desired period, the modulation signal that is generated by adding the third harmonic signal Vh1 whose amplitude is adjusted to the three-phase voltage command signal may be the modulation signal that is used when the PWM converting unit 157 generates the PWM signal. Namely, the modulation signal that is generated by adding the third harmonic signals Vh1 and Vh2 to the three-phase voltage command signal may not be used.

Figure 16:
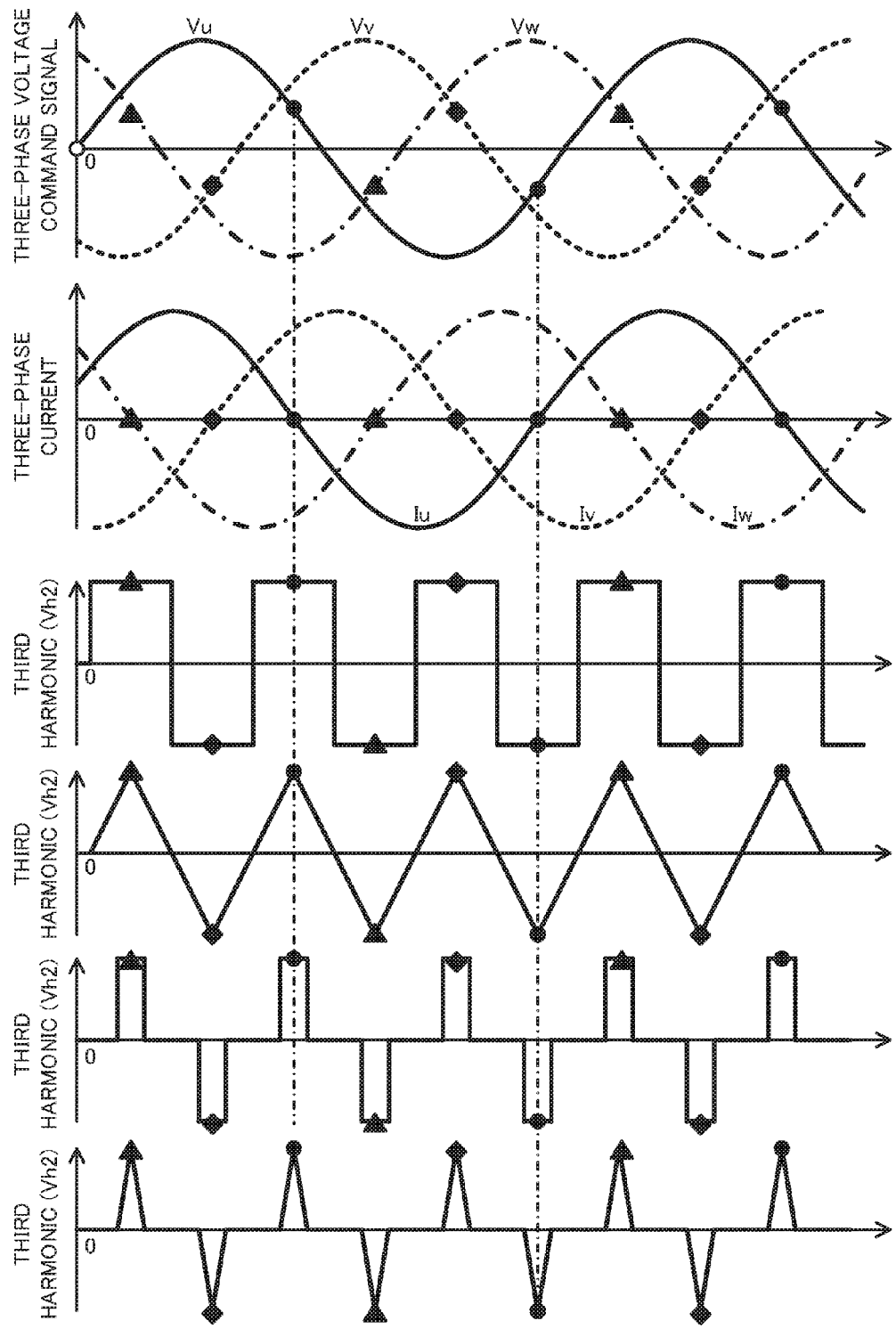
FIG. 16 includes graphs illustrating another examples of the third harmonic signals together with the three-phase voltage command signal and three-phase current.

Incidentally, in the above described explanation, an example in which the third harmonic signal Vh2 is sine wave (see FIG. 4) is explained. However, the third harmonic signal Vh2 may be any AC signal whose frequency is triple the frequency of the three-phase voltage command signal or three-phase current value. For example, as illustrated in a third graph and a fifth graph in FIG. 16, the third harmonic signal Vh2 may be a square wave (what we call, pulse) signal. Alternatively, as illustrated in a fourth graph and a sixth graph in FIG. 16, the third harmonic signal Vh2 may be a triangular wave signal. Alternatively, the third harmonic signal Vh2 may be a signal that has another shape such as sawtooth wave and the like. Namely, the third harmonic signal Vh2 may be a signal in which same wave pattern (preferably, same wave pattern whose signal level varies) appears periodically with a period corresponding to the frequency that is triple the frequency of the three-phase voltage command signal or the three-phase current value. Same applies to the third harmonic signal Vh1.

Moreover, in the above described explanation, an example in which the vehicle 1 has single motor generator 14 is explained. However, the vehicle 1 may have a plurality of motor generators 14. In this case, the vehicle 1 preferably has a plurality of inverters that correspond to the plurality of motor generators 14, respectively. Moreover, in this case, the ECU 15 may perform the above described inverter control operation for each inverter 13 independently. Alternatively, the vehicle 1 may have an engine in addition to the motor generator 14. Namely, the vehicle 1 may be a hybrid vehicle.

Moreover, in the above described explanation, an example in which the vehicle 1 has the inverter 13 and the motor generator 14. However, any apparatus (for example, an apparatus that operates by using the inverter 13 and the motor generator 14, and for example, an air-conditioning apparatus) other than the vehicle 1 may have the inverter 13 and the motor generator 14. Even when any apparatus other than the vehicle 1 has the inverter 13 and the motor generator 14 are, the above described effect can be achieved.

The present invention can be changed, if desired, without departing from the essence or spirit of the invention which can be read from the claims and the entire specification. An electric motor control apparatus, which involves such changes, is also intended to be within the technical scope of the present invention.

REFERENCE SIGNS LIST 1, 2 vehicle control apparatus
11 DC power source
12 smoothing condenser
13 inverter
14 motor generator
15 ECU
151 current command converting unit
152 three-phase/two-phase converting unit
153 current controlling unit
154 two-phase/three-phase converting unit
155 harmonic generating unit
156u, 156v, 156w adder
157 PWM converting unit
258 frequency adjusting unit
Iu U-phase current
Iv V-phase current
Iw W-phase current
Vu U-phase voltage command signal
Vv V-phase voltage command signal
Vw W-phase voltage command signal
Vh1 third harmonic signal
Vh2 third harmonic signal
Vmu U-phase modulation signal
Vmv V-phase modulation signal
Vmw W-phase modulation signal
VH voltage between terminals
Qup, Qvp, Qwp p-side switching element
Qun, Qvn, Qwm n-side switching element
Dup, Dun, Dvp, Dvn, Dwp, Dwn rectifier diode

What is claimed is:

1. An electric motor control apparatus that controls an electric motor system,
the electric motor system having:
a DC (Direct Current) power source;
an electrical power converter that converts DC electrical power supplied from the DC power source to AC (Alternate Current) electrical power;
a smoothing condenser that is connected electrically in parallel to the electrical power converter; and
a three-phase AC electric motor that operates by using the AC electrical power outputted from the electrical power converter, the electric motor control apparatus comprising a controller,
the controller being programmed to:
generate modulation signal by adding third harmonic signal to phase voltage command signal that determines operation of the three-phase AC electric motor;
control the operation of the electrical power converter by using the modulation signal; and
adjust amplitude of the third harmonic signal,
the controller being programmed to adjust the amplitude of the third harmonic signal so that a peak value of voltage between terminals of the smoothing condenser in the case where the amplitude of the third harmonic signal is adjusted is smaller than a peak value of the voltage between the terminals in the case where the amplitude of the third harmonic signal is not adjusted.

2. The electric motor control apparatus according to claim 1, wherein
the controller is programmed to adjust the amplitude of the third harmonic signal so that the amplitude of the third harmonic signal becomes a first predetermined value, if a peak value of the voltage between the terminals in the case where the amplitude of the third harmonic signal is the first predetermined value is smaller than a peak value of the voltage between the terminals in the case where the amplitude of the third harmonic signal is a second predetermined value.

3. The electric motor control apparatus according to claim 1, wherein
the controller is programmed to adjust the amplitude of the third harmonic signal so that a variation width of ripple of the voltage between the terminals at a positive polarity side of a target value of the voltage between the terminals is smaller than a variation width of the ripple of the voltage between the terminals at a negative polarity side of the target value of the voltage between the terminals while a variation width of the ripple of the voltage between the terminals is maintained.

4. The electric motor control apparatus according to claim 1, wherein
the controller is programmed to adjust the amplitude of the third harmonic signal so that a state of the voltage between the terminals changes from a state where a period during which the voltage between the terminals decreases is longer than a period during which the voltage between the terminals increases to a state where the period during which the voltage between the terminals increases is longer than the period during which the voltage between the terminals decreases.

5. The electric motor control apparatus according to claim 1, wherein
the controller is programmed to adjust the amplitude of the third harmonic signal so that a magnitude relation between amplitude-adjusted modulation signal that is the modulation signal generated by adding the third harmonic signal whose amplitude is adjusted and amplitude-non-adjusted modulation signal that is the modulation signal generated by adding the third harmonic signal whose amplitude is not adjusted changes from a first state where signal level of the amplitude-adjusted modulation signal is larger than signal level of the amplitude-non-adjusted modulation signal to a second state where the signal level of the amplitude-adjusted modulation signal is smaller than the signal level of the amplitude-non-adjusted modulation signal or from the second state to the first state.

6. The electric motor control apparatus according to claim 5, wherein
the controller is programmed to adjust the amplitude of the third harmonic signal so that the magnitude relation between the amplitude-adjusted modulation signal and the amplitude-non-adjusted modulation signal changes from the first state to the second state or from the second state to the first state at a border point where the signal levels of the amplitude-adjusted modulation signal and the amplitude-non-adjusted modulation signal become zero.

7. The electric motor control apparatus according to claim 5, wherein
the controller is programmed to adjust the amplitude of the third harmonic signal in an aspect that is determined on the basis of (i) a variation aspect of the signal level of the amplitude-non-adjusted modulation signal and (ii) a magnitude relation between a first current that flows between the DC power source and the smoothing condenser and a second current that flows between the three-phase AC electric motor and the smoothing condenser.

8. The electric motor control apparatus according to claim 7, wherein
the controller is programmed to adjust the amplitude of the third harmonic signal in a first adjusting aspect, if (i) the signal level of the amplitude-non-adjusted modulation signal varies in a first variation aspect and (ii) the magnitude relation between the first and second currents is a first relation,
the controller is programmed to adjust the amplitude of the third harmonic signal in a second adjusting aspect that is different from the first adjusting aspect, if (i) the signal level of the amplitude-non-adjusted modulation signal varies in a second variation aspect that is different from the first variation aspect and (ii) the magnitude relation between the first and second currents is the first relation.

9. The electric motor control apparatus according to claim 8, wherein
the first variation aspect is one of a variation aspect in which the signal level of the amplitude-non-adjusted modulation signal increases as time passes and a variation aspect in which the signal level of the amplitude-non-adjusted modulation signal decreases as time passes,
the second variation aspect is the other one of the variation aspect in which the signal level of the amplitude-non-adjusted modulation signal increases as time passes and the variation aspect in which the signal level of the amplitude-non-adjusted modulation signal decreases as time passes,
the first relation is one of a relation in which the first current is larger than the second current and a relation in which the first current is smaller than the second current,
the first adjusting aspect is one of an adjusting aspect in which the amplitude of the third harmonic signal is increased and an adjusting aspect in which the amplitude of the third harmonic signal is decreased,
the second adjusting aspect is the other one of the adjusting aspect in which the amplitude of the third harmonic signal is increased and the adjusting aspect in which the amplitude of the third harmonic signal is decreased.

10. The electric motor control apparatus according to claim 7, wherein
the controller is programmed to adjust the amplitude of the third harmonic signal in a first adjusting aspect, if (i) the signal level of the amplitude-non-adjusted modulation signal varies in a first variation aspect and (ii) the magnitude relation between the first and second currents is a first relation,
the controller is programmed to adjust the amplitude of the third harmonic signal in a second adjusting aspect that is different from the first adjusting aspect, if (i) the signal level of the amplitude-non-adjusted modulation signal varies in the first variation aspect and (ii) the magnitude relation between the first and second currents is a second relation that is different from the first relation.

11. The electric motor control apparatus according to claim 10, wherein
the first variation aspect is one of a variation aspect in which the signal level of the amplitude-non-adjusted modulation signal increases as time passes and a variation aspect in which the signal level of the amplitude-non-adjusted modulation signal decreases as time passes,
the first relation is one of a relation in which the first current is larger than the second current and a relation in which the first current is smaller than the second current,
the second relation is the other one of the relation in which the first current is larger than the second current and the relation in which the first current is smaller than the second current,
the first adjusting aspect is one of an adjusting aspect in which the amplitude of the third harmonic signal is increased and an adjusting aspect in which the amplitude of the third harmonic signal is decreased,
the second adjusting aspect is the other one of the adjusting aspect in which the amplitude of the third harmonic signal is increased and the adjusting aspect in which the amplitude of the third harmonic signal is decreased.

12. The electric motor control apparatus according to claim 5, wherein
the controller is programmed to control the operation of the electrical power converter on the basis of a magnitude relation between the modulation signal and carrier signal having predetermined frequency,
the first state is (i) a state where a period during which the amplitude-adjusted modulation signal is smaller than the carrier signal is shorter than a period during which the amplitude-non-adjusted modulation signal is smaller than the carrier signal or (ii) a state where a period during which the amplitude-adjusted modulation signal is larger than the carrier signal is longer than a period during which the amplitude-non-adjusted modulation signal is larger than the carrier signal,
the second state is (i) a state where the period during which the amplitude-adjusted modulation signal is smaller than the carrier signal is longer than the period during which the amplitude-non-adjusted modulation signal is smaller than the carrier signal or (ii) a state where the period during which the amplitude-adjusted modulation signal is larger than the carrier signal is shorter than the period during which the amplitude-non-adjusted modulation signal is larger than the carrier signal.

13. The electric motor control apparatus according to claim 5,
the controller is programmed to control the operation of the electrical power converter on the basis of a magnitude relation between the modulation signal and carrier signal having predetermined frequency,
the controller is programmed to adjust the amplitude of the third harmonic signal so that the magnitude relation between the amplitude-adjusted modulation signal and the amplitude-non-adjusted modulation signal in one of three phases changes from the first state to the second state or from the second state to the first state in a period during which an absolute value of the signal level of the modulation single in each of the other two of three phases is larger than an absolute value of a peak value of signal level of the carrier signal.

14. The electric motor control apparatus according to claim 1,
the controller is programmed to control the operation of the electrical power converter on the basis of a magnitude relation between the modulation signal and carrier signal having predetermined frequency,
the controller is programmed to (i) adjust the amplitude of the third harmonic signal, if an absolute value of signal level of the modulation single in each of two of three phases is larger than an absolute value of a peak value of signal level of the carrier signal and (ii) the controller is programmed not to adjust the amplitude of the third harmonic signal, if the absolute value of the signal level of the modulation single in each of the two of three phases is not larger than the absolute value of the peak value of the signal level of the carrier signal.

15. The electric motor control apparatus according to claim 1,
the controller is programmed to control the operation of the electrical power converter on the basis of a magnitude relation between the modulation signal and carrier signal having predetermined frequency,
the controller is programmed to adjust amplitude of the carrier signal,
the controller is programmed to adjust the amplitude of the carrier signal so that a peak value of the voltage between the terminals in the case where the amplitude of the carrier signal is adjusted is smaller than a peak value of the voltage between the terminals in the case where the amplitude of the carrier signal is not adjusted.

* * * * *

UNITED STATES PATENT AND TRADEMARK OFFICE
CERTIFICATE OF CORRECTION

PATENT NO. : 9,553,541 B2  
APPLICATION NO. : 14/913203  
DATED : January 24, 2017  
INVENTOR(S) : Toshifumi Yamakawa et al.

It is certified that error appears in the above-identified patent and that said Letters Patent is hereby corrected as shown below:

In the Specification

Column 17, Line 6, change "Gyp" to "Gvp"

Column 17, Line 16, change "Gyp" to "Gvp"

Column 21, Line 57, change "Gyp" to "Gvp"

Column 21, Line 65, change "Gyp" to "Gvp"

Column 24, Line 25, change "Gyp" to "Gvp"

Column 25, Line 30, change "voltage VII" to "voltage VH"

Column 29, Line 63, change "Vmw W-phase" to "Vmw (=W-phase"

Column 30, Line 5, change "Gyp" to "Gvp"

Column 32, Line 32, change "Gyp" to "Gvp"

Column 36, Line 3, change "VII" to "VH"

Column 40, Line 23, change "VII" to "VH"

Signed and Sealed this  
Twelfth Day of June, 2018

Andrei Iancu  
*Director of the United States Patent and Trademark Office*